(12) United States Patent
Takaba

(10) Patent No.: US 10,791,214 B2
(45) Date of Patent: Sep. 29, 2020

(54) ELECTRONIC DEVICE, CONTROL METHOD, AND MEDIUM

(71) Applicant: KYOCERA Corporation, Kyoto-shi, Kyoto (JP)

(72) Inventor: Yukiko Takaba, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/879,173

(22) Filed: Jan. 24, 2018

(65) Prior Publication Data
US 2018/0219989 A1 Aug. 2, 2018

(30) Foreign Application Priority Data
Jan. 27, 2017 (JP) .................. 2017-012857

(51) Int. Cl.
*H04M 1/725* (2006.01)
*G06F 3/041* (2006.01)
(Continued)

(52) U.S. Cl.
CPC ............ *H04M 1/7258* (2013.01); *G06F 3/02* (2013.01); *G06F 3/0412* (2013.01);
(Continued)

(58) Field of Classification Search
CPC ............... H04M 1/7258; H04M 1/576; H04M 1/72597; H04M 2250/12; H04M 2250/22; H04M 1/006; H04M 1/2745; H04M 3/42102; H04M 3/42391; H04M 7/0012; H04M 7/0024; G06F 3/02; G06F 3/0412; G06F 3/04886; G06F 3/018; G06F 3/0416; G06F 3/0481; G06F 3/0484; H04L 12/66; H04L 41/00; H04L 41/22; H04L 65/1003; H04L 65/1006; H04L 65/1083; H04L 65/1093; H04L 65/1096; H04L 65/403; H04W 4/16; H04N 7/141; H04N 7/147
(Continued)

(56) References Cited

U.S. PATENT DOCUMENTS

| | | | | | |
|---|---|---|---|---|---|
| 4,924,496 | A | * | 5/1990 | Figa ...................... | H04M 1/56 379/142.06 |
| 8,594,315 | B1 | * | 11/2013 | Daily ..................... | H04M 1/56 379/355.05 |

(Continued)

FOREIGN PATENT DOCUMENTS

| | | |
|---|---|---|
| JP | 2000-196709 A | 7/2000 |
| JP | 2010-136151 A | 6/2010 |
| WO | 20081086302 A1 | 7/2008 |

*Primary Examiner* — Yuwen Pan
*Assistant Examiner* — Paul P Tran
(74) *Attorney, Agent, or Firm* — Hauptman Ham, LLP

(57) ABSTRACT

An electronic device according to one embodiment includes a touch screen, a plurality of software keys that are aligned along an edge of the touch screen, a storage that stores address list data, a communication unit that establishes telephone communication, and a controller. If detecting an incoming phone call by the communication unit, the controller identifies a first group to which the incoming phone call belongs based on information relating to the incoming phone call and information of the address list data, and assigns the identified first group to the software key.

5 Claims, 12 Drawing Sheets

| FIRST GROUP | SOFTWARE KEY TO WHICH FIRST GROUP IS ASSIGNED |
|---|---|
| CALLER REGISTERED IN ADDRESS LIST DATA | SOFTWARE KEY $30b_1$ |
| ANONYMOUS CALL | SOFTWARE KEY $30b_2$ |
| PAYPHONE | SOFTWARE KEY $30b_3$ |
| CALLER NOT REGISTERED IN ADDRESS LIST DATA | SOFTWARE KEY $30b_4$ |

(51) Int. Cl.
*G06F 3/02* (2006.01)
*H04M 1/57* (2006.01)
*G06F 3/0488* (2013.01)

(52) U.S. Cl.
CPC ........ *G06F 3/04886* (2013.01); *H04M 1/576* (2013.01); *H04M 1/72597* (2013.01); *H04M 2250/22* (2013.01)

(58) Field of Classification Search
USPC ....................................................... 455/566
See application file for complete search history.

(56) References Cited

U.S. PATENT DOCUMENTS

| | | | |
|---|---|---|---|
| 2007/0133770 A1* | 6/2007 | LaPierre | H04M 1/575 379/142.01 |
| 2009/0005024 A1* | 1/2009 | Kato | H04W 4/16 455/417 |
| 2009/0067609 A1* | 3/2009 | Handa | H04M 3/48 379/221.14 |
| 2009/0176518 A1* | 7/2009 | Doni | H04W 4/12 455/466 |
| 2010/0144395 A1* | 6/2010 | Komiya | G06F 3/016 455/566 |
| 2011/0317684 A1* | 12/2011 | Lazzaro | G06Q 30/04 370/352 |
| 2014/0232815 A1* | 8/2014 | Cili | H04M 1/72597 348/14.08 |
| 2016/0088161 A1* | 3/2016 | Parent | H04N 7/141 348/14.01 |
| 2016/0112086 A1* | 4/2016 | Lei | H04B 1/3888 455/566 |
| 2017/0019756 A1* | 1/2017 | Kim | H04M 1/274558 |

* cited by examiner

| IDENTIFICATION NUMBER | GROUP NAME | NAME | PHONE NUMBER |
|---|---|---|---|
| ID1 | FAMILY | TARO KYOSERA | 000-1234-5678 |
| ID2 | FRIEND | JIRO SATO | 000-2345-6789 |
| ID3 | WORK | OFFICE | 000-3456-7890 |
| ID4 | SHOP | BARBER | 000-4567-8901 |

| FIRST GROUP | SOFTWARE KEY TO WHICH FIRST GROUP IS ASSIGNED |
|---|---|
| CALLER REGISTERED IN ADDRESS LIST DATA | SOFTWARE KEY $30b_1$ |
| ANONYMOUS CALL | SOFTWARE KEY $30b_2$ |
| PAYPHONE | SOFTWARE KEY $30b_3$ |
| CALLER NOT REGISTERED IN ADDRESS LIST DATA | SOFTWARE KEY $30b_4$ |

| FIRST GROUP | SOFTWARE KEY TO WHICH FIRST GROUP IS ASSIGNED | SECOND GROUP | SOFTWARE KEY TO WHICH SECOND GROUP IS ASSIGNED |
|---|---|---|---|
| CALLER REGISTERED IN ADDRESS LIST DATA | $30b_1$ | FAMILY | $30a_1$ |
| | | FRIEND | $30a_2$ |
| | | WORK | $30a_3$ |
| | | SHOP | $30a_4$ |
| ANONYMOUS CALL | $30b_2$ | - | - |
| PAYPHONE | $30b_3$ | - | - |
| CALLER NOT REGISTERED IN ADDRESS LIST DATA | $30b_4$ | - | - |

ELECTRONIC DEVICE, CONTROL METHOD, AND MEDIUM

CROSS-REFERENCE TO RELATED APPLICATION

The present application claims priority under 35 U.S.C. § 119 to Japanese Patent Application No. 2017-012857 filed on Jan. 27, 2017, entitled "ELECTRONIC DEVICE, CONTROL METHOD, AND PROGRAM". The content of which is incorporated by reference herein in its entirety.

FIELD

The present application relates to an electronic device, a control method, and a medium.

BACKGROUND

There are electronic devices on which hardware keys and a touch screen or the like are mounted. For example, there is an electronic device that performs various kinds of processing according to an operation detected through a hardware key and a touch screen.

SUMMARY

An electronic device according to one embodiment includes a touch screen, a plurality of software keys that are aligned along an edge of the touch screen, a storage that stores address list data, a communication unit that establishes telephone communication, and a controller. If detecting an incoming phone call by the communication unit, the controller identifies a first group to which the incoming phone call belongs based on information relating to the incoming phone call and information of the address list data, and assigns the identified first group to the software key.

A control method of an electronic device according to one aspect includes a touch screen, a plurality of software keys that are aligned along an edge of the touch screen, a storage that stores address list data, and a communication unit that establishes telephone communication. The control method includes identifying, if an incoming phone call is detected by the communication unit, a first group to which the incoming phone call belongs based on information relating to the incoming phone call and information of the address list data, and assigning the identified first group to the software key.

A non-transitory computer readable recording medium storing therein a code according to one embodiment causes an electronic device that includes a touch screen, a plurality of software keys that are aligned along an edge of the touch screen, a storage that stores address list data, and a communication unit that establishes telephone communication to perform identifying, if an incoming phone call is detected by the communication unit, a first group to which the incoming phone call belongs based on information relating to the incoming phone call and information of the address list data, and assigning the identified first group to the software key.

BRIEF DESCRIPTION OF THE DRAWINGS

FIG. 5 illustrates one example of configuration data;

DETAILED DESCRIPTION

Figure 1:
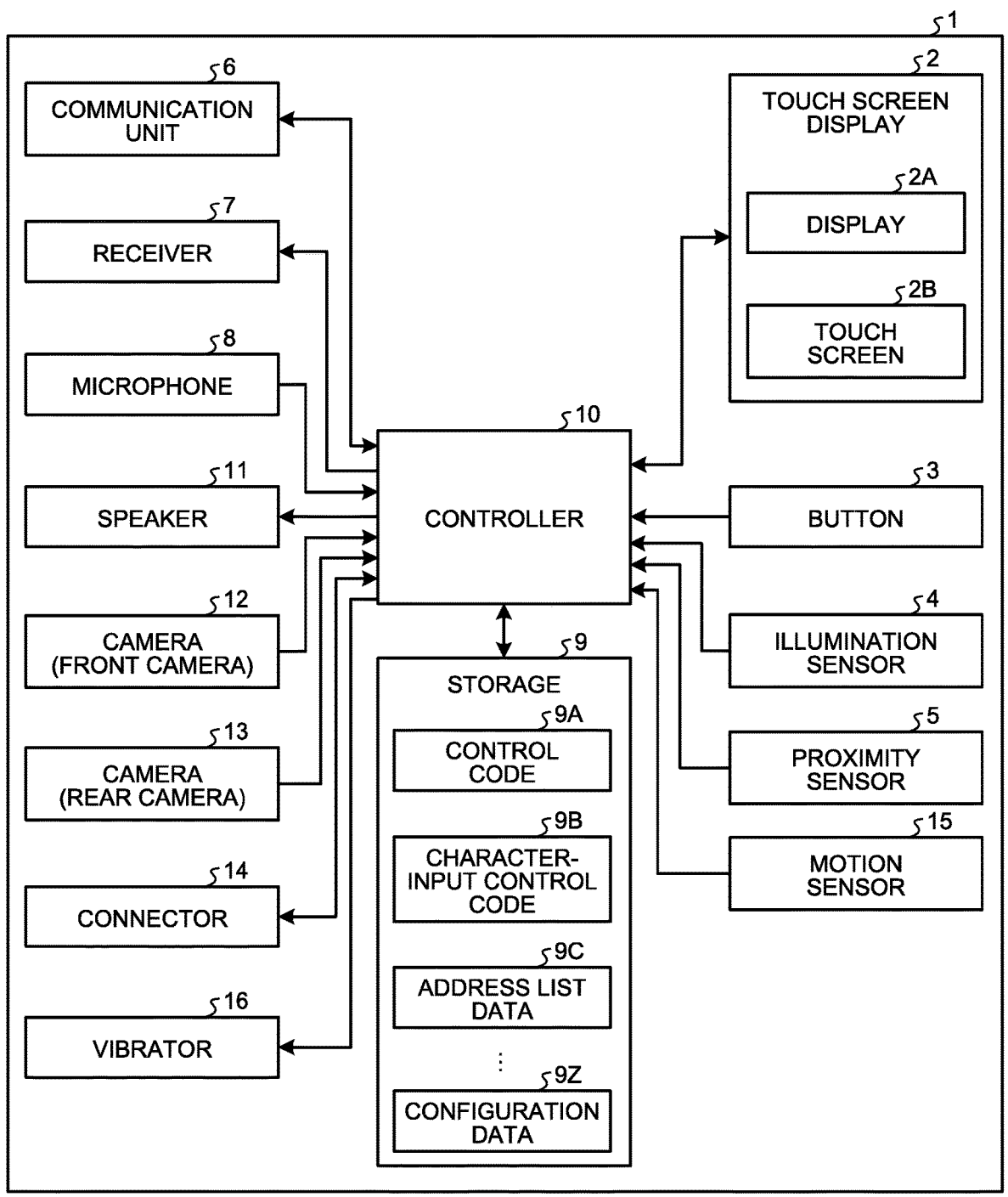
FIG. 1 is a block diagram illustrating one example of a functional configuration of an electronic device according to an embodiment.

In the electronic device described above, it may be necessary for a user to view an indication on a touch screen display to confirm who is a caller of an incoming phone call. The electronic device described above may have been susceptible to improvement in technique of letting a user confirm who is a caller of an incoming phone call.

Embodiments to implement an electronic device, a control method, and a medium according to the present application are explained in detail, referring to the drawings.

The electronic device according to the present application can be a device having a telephone function, such as a mobile phone, a tablet, a portable personal computer, a media player, an electronic book reader, a navigator, a wearable device, and a gaming device.

FIG. 1 is a block diagram illustrating one example of a functional configuration of an electronic device according to an embodiment. In the following explanation, like reference symbols can be used for like parts. In the following explanation, duplicated explanation can be omitted.

As illustrated in FIG. 1, an electronic device 1 includes a touch screen display 2, a button 3, an illumination sensor 4, a proximity sensor 5, a communication unit 6, a receiver 7, a microphone 8, a storage 9, a controller 10, a speaker 11, a camera 12, a camera 13, a connector 14, a motion sensor 15, and a vibrator 16.

The touch screen display 2 includes a display 2A and a touch screen 2B. The display 2A and the touch screen 2B can be arranged to overlap with each another, aligned next to each other, or arranged apart from each other. When the display 2A and the touch screen 2B are arranged to overlap with each other, for example, one or more sides of the display 2A are not required to be positioned along any side of the touch screen 2B.

The display 2A includes a display device, such as a liquid crystal display (LCD), an organic electroluminescence display (OELD), and an inorganic electroluminescence display (IELD). The display 2A displays objects, such as characters, images, symbols, and graphics, within a screen. The screen including an object that is displayed by the display 2A includes a screen called lock screen, a screen called home screen, and an application screen that is displayed while an application is being executed. The home screen is sometimes called desktop, standby screen, idle screen, standard screen, app list screen, or launcher screen.

The touch screen 2B detects a contact or an approach of a finger, a pen, a stylus pen, or the like with respect to the touch screen 2B. The touch screen 2B can detect a position on the touch screen 2B when a finger, a pen, a stylus pen, or the like touches with or approaches the touch screen 2B. In the following explanation, a position at which a finger, a pen, a stylus pen, and the like detected by the touch screen 2B contact with or approach the touch screen 2B is expressed as "detection position". The touch screen 2B notifies of a contact or an approach of a finger with respect to the touch screen 2B to the controller 10 together with the detection position. The touch screen 2B can notify the controller 10 of a contact or an approach by notifying of the detection position. The touch screen display 2 including the touch screen 2B is capable of performing operations that the touch screen 2B can perform. In other words, the operations performed by the touch screen 2B can be performed by the touch screen display 2.

The controller 10 determines a type of gesture based on at least one of a contact or an approach detected by the touch screen 2B, a detection position, a change in detection position, duration of a contact or an approach, an interval between detected contacts or approaches, and the number of times of detection of a contact or an approach. The electronic device 1 including the controller 10 is capable of performing operations that the controller 10 can perform. In other words, the operations performed by the controller 10 can be performed by the electronic device 1. The gesture is an operation that is made with respect to the touch screen 2B by a finger. The operation made with respect to the touch screen 2B can be made with respect to the touch screen display 2 including the touch screen 2B. Examples of the gesture determined by the controller 10 through the touch screen 2B includes, but are not limited to, a touch, a long touch, a release, a swipe, a tap, a double tap, a long tap, a drug, a flick, a pinch-in, and a pinch-out.

A detection method of the touch screen 2B can be of any method, such as a capacitive method, a resistive film method, a surface acoustic wave method, an infrared method, and a load detection method.

Figure 2:
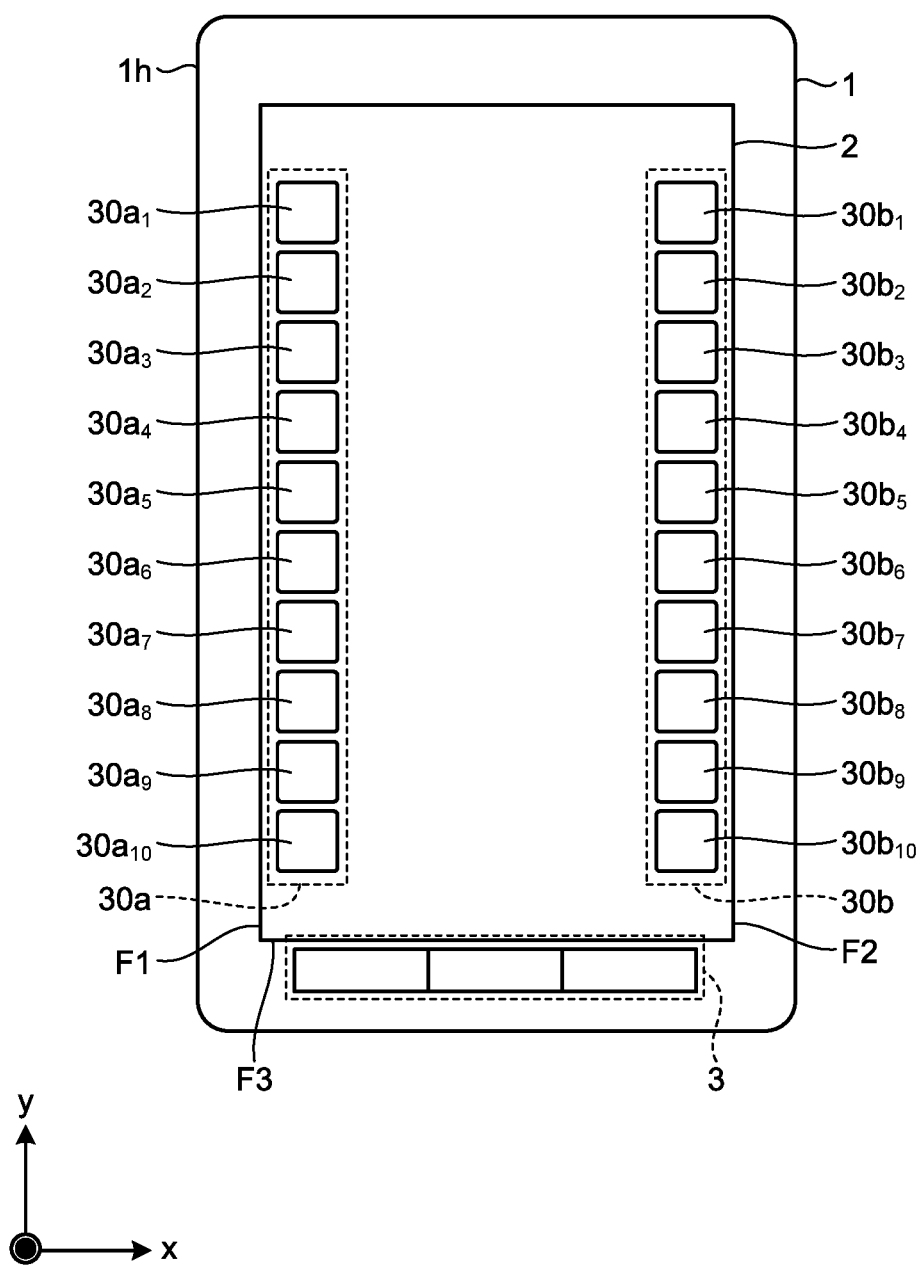
FIG. 2 illustrates a display example of software keys according to the embodiment.

FIG. 2 illustrates a display example of software keys according to the embodiment. The touch screen display 2 displays multiple software keys along an edge of the touch screen display 2. In the example illustrated in FIG. 2, the touch screen display 2 displays software keys $30a_1, \ldots, 30a_{10}$ in a display region $30a$ on the touch screen display 2 (display 2A). The software keys $30a_1, \ldots, 30a_{10}$ are arranged in a row aligned along a direction parallel to a y-axis illustrated in FIG. 2, along an edge F1 of the touch screen display 2. Similarly, the touch screen display 2 displays software keys $30b_1, \ldots, 30b_{10}$ in a display region $30b$ on the touch screen display 2 (display 2A). The software keys $30b_1, \ldots, 30b_{10}$ are arranged in a row aligned along a direction parallel to the y-axis illustrated in FIG. 2, along an edge F2 of the touch screen display 2. The number of the software keys is not limited to the example illustrated in FIG. 2, and can be an arbitrary number as necessary. The software keys $30a_1, \ldots, 30a_{10}$ and the software keys $30b_1, \ldots, 30b_{10}$ are one example of software keys. The software keys $30a_1, \ldots, 30a_{10}$ and the software keys $30b_1, \ldots, 30b_{10}$ can be aligned to be displayed in the display regions $30a, 30b$ on the touch screen display 2 at the time of, for example, inputting characters, receiving calls, and the like.

The button 3 accepts an operation input from a user.

Figures 3, 4:
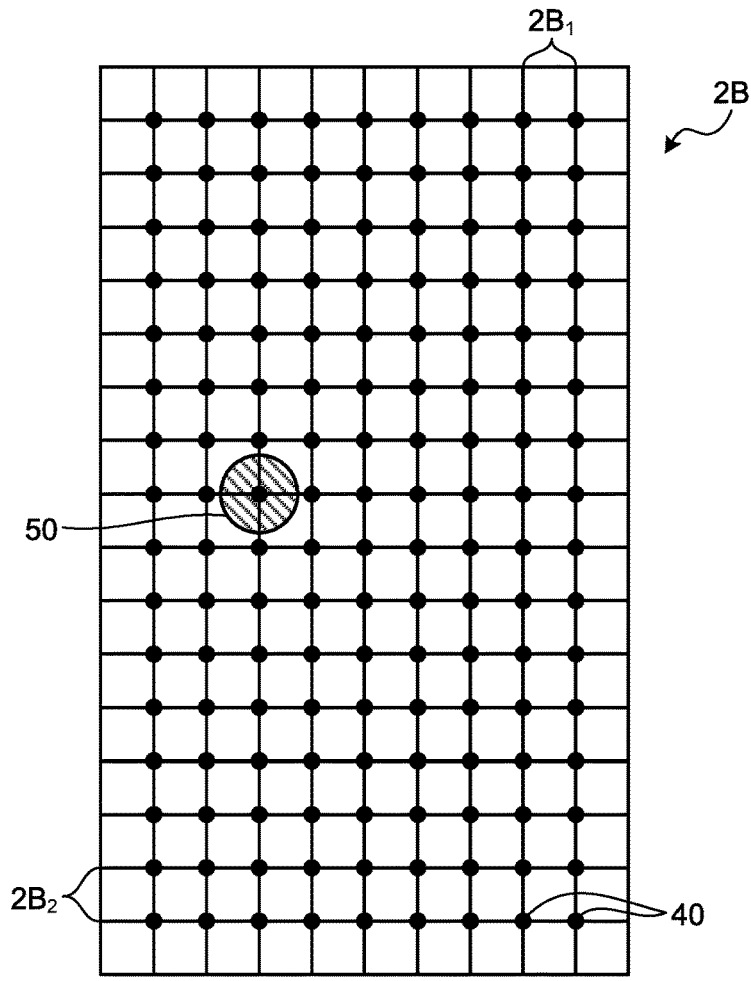
FIG. 3 illustrates one example of a structure of a touch screen according to the embodiment.
FIG. 4 illustrates one example of address list data.

One example of a structure of the touch screen 2B according to the embodiment is explained using FIG. 3. FIG. 3 illustrates one example of a structure of a touch screen according to the embodiment. As illustrated in FIG. 3, the touch screen 2B includes first electrodes $2B_1$ and second electrodes $2B_2$. The first electrodes $2B_1$ extend in a direction of length of the touch screen 2B. The second electrodes $2B_2$ extend in a direction of width of the touch screen 2B. The touch screen 2B arranges the first electrodes $2B_1$ and the second electrodes $2B_2$ so as to be intersecting in a lattice manner. The touch screen 2B detects a contact or an approach of a conductive object, such as a finger, with respect to a software key on the touch screen display 2 (display 2A) at each position (detection point) 40 at which the first electrodes $2B_1$ and the second electrodes $2B_2$ intersect. When a conductive object approaches the touch screen 2B, capacity coupling occurs between the touch screen 2B and the object. The touch screen 2B detects a contact point 50 or the like of the conductive object such as a finger by sensing the capacity coupling at the detection point 40.

The controller 10 can detect, through the touch screen display 2 (touch screen 2B), a touch gesture with respect to a software key that is displayed on the touch screen display 2. The controller 10 can detect a touch with respect to one or more software keys. The controller 10 can detect a long touch with respect to one or more software keys.

When detecting, for example, an operation with respect to a software key and an operation with respect to one other than a software key through the touch screen display 2 (touch screen 2B) at the same time, the controller 10 can perform processing, giving priority to the latest operation. In a state in which an operation with respect to a software key is detected through the touch screen panel 2 (touch screen 2G), for example, the controller 10 can handle an operation with respect to one other than the software key as an ineffective operation.

The illumination sensor 4 detects illumination. The illumination is a value of light beams that enter a unit area on a measurement surface of the illumination sensor 4. The illumination sensor 4 is used to adjust, for example, the brightness of the display 2A.

The proximity sensor 5 detects a presence of an adjacent object in a noncontact manner. The proximity sensor 5 detects a presence of an object based on a change in magnetic field, a change in returning time of a reflected wave of an ultrasonic wave, or the like. The proximity sensor 5 detects, for example, that the display 2A and a face come close to each other. The illumination sensor 4 and the proximity sensor 5 can be configured as one sensor. The illumination sensor 4 can be used as the proximity sensor.

The communication unit 6 performs wireless communication. Wireless communication standards supported by the communication unit 6 include a cellular phone communication standard, such as 2G, 3G, 4G, and 5G, and a short-distance wireless communication standard. Examples of the cellular phone communication standard include, but are not limited to, long term evolution (LTE), wideband code division multiple access (W-CDMA), worldwide interoperability for microwave access (WiMAX (registered trademark)), CDMA2000, personal digital cellular (PDC), global system for mobile communications (GSM (registered trademark)), personal handy-phone system (PHS), etc. Examples of the short-distance wireless communication standard include, but are not limited to, IEEE802.11, Bluetooth (registered trademark), infrared data association (IrDA), near field communication (NFC), wireless personal area network (WPAN), etc. Examples of the WPAN communication standard include, but are not limited to, ZigBee (registered trademark). The communication unit 6 can support one or more communication standards above.

The receiver 7 outputs a sound signal transmitted from the controller 10 as a sound. The receiver 7 can output, for example, a sound of moving image reproduced by the electronic device 1, a sound of music, a voice of a person on the other end in a telephone conversation, and the like. The microphone 8 converts an input voice of a user or the like into a sound signal to transmit it to the controller 10.

The storage 9 stores codes and data. The storage 9 can be used as a work area in which a processing result of the controller 10 is temporarily stored. The storage 9 can include an arbitrary non-transitory recording medium, such as a semiconductor storage medium and a magnetic storage medium. The storage 9 can include more than one type of storage medium. The storage 9 can include a combination of a storage medium, such as a memory card, an optical disk, and a magneto-optical disk, and a reading device of the storage medium. The storage 9 can include a storage device that is used as a temporary storage region, such as a random-access memory (RAM).

The code stored in the storage 9 includes an application that is executed in the foreground or background, and a support code that supports operation of the application (not illustrated). The application displays a screen relating to the application, for example, when executed in the foreground, on the display 2A. Examples of the support code include, but are not limited to, an operating system (OS). The code can be installed in the storage 9 by wireless communication by the communication unit 6, or through a non-transitory storage medium.

The storage 9 can store a control code 9A, a character-input control code 9B, address list data 9C, configuration data 9Z, and the like. The control code 9A can operate in cooperation with various kinds of applications stored in the electronic device 1 at the time of providing various functions. The control code 9A can operate, linked to a cloud storage through the communication unit 6, and can access a file and data stored in the cloud storage. The cloud storage can store a part, or all of the codes and data stored in the storage 9.

The control code 9A can provide respective functions to implement processing relating to various operations of the electronic device 1. The function provided by the control code 9A includes a function of adjusting the brightness of the display 2A based on a detection result of the illumination sensor 4. The function provided by the control code 9A includes a function of invalidating an operation made with respect to the touch screen 2B based on a detection result of the proximity sensor 5. The function provided by the control code 9A includes a function of notifying of an arrival of a phone call of the communication unit 6. The function provided by the control code 9A includes a function of assigning, to a software key, a first group to which an incoming phone call belongs. The function provided by the control code 9A includes a function of enabling a telephone conversation by controlling the communication unit 6, the receiver 7, the microphone 8, and the like. The function provided by the control code 9A includes a function of controlling photographic processing of the camera 12 and the camera 13. The function provided by the control code 9A includes a function of controlling communication with an external device that is connected through the connector 14. The function provided by the control code 9A includes a function of performing various kinds of controls such as changing information that is displayed on the display 2A according to a gesture determined based on a detection result of the touch screen 2B. The function provided by the control code 9A includes a function of detecting travel and stop of a user carrying the electronic device 1 based on a detection result of the motion sensor 15. The function provided by the control code 9A includes a function of reading subject information with voice. The function provided by the control code 9A includes a function of managing the address list data 9C.

The character-input control code 9B can provide functions of controlling character input that is performed in the electronic device 1. The character-input control code 9B can provide a function of assigning, for example when an operation with respect to a software key is detected, to each of software keys associated with the software key for which the operation is detected, at least one character associated with the software keys. The character-input control code 9B can provide a function of reading subject information with voice.

The character-input control code 9B can provide a function of assigning characters to software keys, and of implementing character input based on an operation of a user with respect to the software keys in the electronic device 1.

For example, when a user performs character input, the electronic device 1 can assign A-column, Ka-column, Sa-column, Ta-column, Na-column, Ha-column, Ma-column, Ya-column, Ra-column, and Wa-column of Japanese syllabary to the software keys $30a_1, \ldots, 30a_{10}$, respectively. For example, the electronic device 1 can assign characters to the software keys $30b_1, \ldots, 30b_5$ per software key for which an operation has been detected out of the software keys $30a_1, \ldots, 30a_{10}$. For example, when an operation with respect to the software key $30a_1$ is detected ($30a_1$=a-column), Japanese syllabary characters of "a", "i", "u", "e", "o" can be assigned to the software keys $30b_1, \ldots, 30b_5$, respectively. When detecting a determination operation to a software key, the electronic device 1 can accept input of a character that is assigned to the software key.

For example, the electronic device 1 can assign characters of "abc", "def", "ghi", "jkl", "mno", "pqrs", "tuv", "wxyz", "./@" to the software keys $30a_1, \ldots 30a_9$, respectively. In this case, the electronic device 1 can assign characters of "a", "b", "c", "A", "B", "C" to the software keys $30b_1, \ldots, 30b_6$, respectively when an operation with respect to the software key $30a_1$ is detected. To the software keys, edit functions such as return, delete, and convert can be assigned in addition to characters other than the above characters.

The address list data 9C includes address information of a person on the other end of a phone. The address information includes various kinds of information of, for example, name, phone number, and the like. The address information can be assigned to a group corresponding to the person on the other end of a phone. For example, the address information can include an e-mail address, an image, an account that is used when various kinds of messages are posted by the person on a communication site, such as a social network service (SNS), and the like.

The configuration data 9Z includes information used for processing that is performed by the control code 9A. The configuration data 9Z includes information that indicates correspondence between a category of information relating to an incoming phone call and a software key to which the type is assigned. The configuration data 9Z includes, for example, various kinds of information relating to configurations such as a manner mode and a silent mode. The manner mode is a mode in which the electronic device 1 is vibrated by the vibrator 16 without outputting a call notification tone and a ringtone. The silent mode is a mode in which only display on the display 2A is performed, and a call notification tone and a ringtone are not output, and vibration is not generated.

The controller 10 includes an arithmetic processing unit. Examples of the arithmetic processing unit include, but are not limited to, a central processing unit (CPU), a system-on-a-chip (SoC), a micro control unit (MPU), a field-programmable gate array (FPGA), and a coprocessor. The controller 10 implements various kinds of functions by integrally controlling operation of the electronic device 1.

Specifically, the controller 10 can execute a command that is included in a code stored in the storage 9. The controller 10 can refer to data stored in the storage 9 as necessary. The controller 10 can control functional units in response to data and a command. The controller 10 can implement respective functions by controlling the functional units. Examples of the functional unit include, but are not limited to, the display 2A, the communication unit 6, the microphone 8, the speaker 11, and the vibrator 16. The controller 10 can change the control according to a detection result of the detector. Examples of the detector include, but are not limited to, the touch screen 2B, the button 3, the illumination sensor 4, the proximity sensor 5, the microphone 8, the camera 12, the camera 13, and the motion sensor 15.

The controller 10 can implement processing relating to various kinds of operations of the electronic device 1 by executing the control code 9A. The controller 10 can implement processing relating to receiving a phone call of the communication unit 6 by executing the control code 9A. Examples of the processing relating to receiving a phone call include, but are not limited to, processing relating to notification of an arrival of a phone call, processing relating to an operation to start communication according to a received phone call, processing relating to making a phone call, etc.

The controller 10 can implement processing of controlling character input, character edition, and the like that are performed in the electronic device 1 by executing the character-input control code 9B. For example, when the controller 10 detects an operation with respect to a software key, the controller 10 can implement processing of assigning, to each of software keys that are associated with the software key for which the operation has been detected, at least one character associated in advance with the software keys, by executing the character-input control code 9B. The controller 10 can implement, for example, processing of performing character input or character edition using multiple software keys by executing the character-input control code 9B. The controller 10 is one example of a controller.

The speaker 11 outputs a sound signal that is output from the controller 10 as a sound. The speaker 11 is used to output, for example, a ringtone, a voice, music, etc. One of the receiver 7 and the speaker 11 can have the function of the other.

The camera 12 and the camera 13 convert a captured image into an electrical signal. The camera 12 is a front camera that images an object facing the display 2A. The camera 13 is a rear camera that images an object facing a surface on the opposite side of the display 2A. The camera 12 and the camera 13 can be mounted as a camera unit capable of switching between the front camera and the rear camera to be used, in a functionally and physically integrated state in the electronic device 1.

The connector 14 is a terminal to which other devices are connected. The connector 14 can be a general-purpose terminal, such as universal serial bus (USB), high-definition multimedia interface (HDMI (registered trademark)), Light Peak (Thunderbold (registered trademark)), and an earphone connector. The connector 14 can be a dedicated terminal such as a dock connector. Examples of the device connected to the connector 14 include, but are not limited to, an external storage, a speaker, and a communication device.

The motion sensor 15 can detect various kinds of information to determine an operation of a user that carries the electronic device 1. The motion sensor 15 can be configured as a sensor unit that includes an acceleration sensor, a direction sensor, a gyroscope, a magnetic sensor, an atmospheric pressure sensor, and the like.

The vibrator 16 vibrates a housing 1h of the electronic device 1. The vibrator 16 has, for example, a piezoelectric device, an eccentric device, or the like to generate vibration. For example, when an item of manner mode in the configuration data 9Z is effective, the vibrator 16 vibrates with the control of the controller 10 to notify of an arrival of a phone call.

The electronic device 1 can include a global positioning system (GPS) receiver in addition to the various functional modules described above. GPS receivers receive a radio wave signal of a predetermined frequency band from a GPS satellite. The GPS receiver demodulates the received radio wave signal, and sends the processed signal to the controller 10. The GPS receiver supports arithmetic processing for a current position of the electronic device 1. The electronic device 1 can have a receiver that is capable of receiving a signal from an artificial satellite for positioning other than a GPS satellite, and can perform arithmetic processing of a current position. The electronic device 1 is equipped with a functional unit such as a battery that is naturally used to maintain the functions of the electronic device 1, and a control unit that is naturally used to implement the control of the electronic device 1.

The electronic device 1 can access a storage server on a cloud through the communication unit 6, and can acquire various kinds of codes and data therefrom.

FIG. 4 illustrates one example of the address list data 9C. The address list data 9C includes one or more pieces of address information. The address information includes items of identification number, group name, name, phone number, etc. In the item of identification number, information to identify address information is specified. In the item of group name, for example, information of a second group is specified. In the second group, information indicating group that is assigned by a user or the like of the electronic device 1, group determined in advance, etc. is specified. In the item of name, for example, information of name of a person, a company, a store, etc. is specified. In the item of phone number, information of phone number of a communication partner is specified.

In the example illustrated in FIG. 4, as the address information of the identification number "ID1", "family" is specified in the item of group name, "Taro Kyocera" is specified in the item of name, and "000-1234-5678" is specified in the item of phone number. As the address information of the identification number "ID2", "friend" is specified in the item of group name, "Jiro Sato" is specified in the item of name, and "000-2345-6789" is specified in the item of phone number. As the address information of the identification number "ID3", "work" is specified in the item of group name, "office" is specified in the item of name, and "000-3456-7890" is specified in the item of phone number. As the address information of the identification number "ID4", "shop" is specified in the item of group name, "barber" is specified in the item of name, and "000-4567-8901" is specified in the item of phone number.

FIG. 5 illustrates one example of the configuration data 9Z. The configuration data 9Z includes information that indicates correspondence between the first group and a software key to which the first group is assigned. The first group includes a group identifiable based on information relating to an incoming phone call and information in the address list data 9C. Examples of the information relating to an incoming phone call include, but are not limited to, information indicating a phone number of a source of a phone call, information indicating that a source of a phone call is anonymous, information indicating that a source of a phone call is a payphone, etc. The first group includes, for example, a group to make a user recognize a type of an incoming phone call. The electronic device 1 can let a user set correspondence between the first group in the configuration data 9Z and a software key. The user can identify the first group based on the software key by remembering the correspondence between the first group in the configuration data 9Z and the software key. For example, when the user wishes to know whether information relating to an incoming phone call is registered in the address list data 9C, the user sets information indicating a person registered in the address list data 9C, or the like as the first group in the configuration data 9Z.

FIG. 5 illustrates an example of the configuration data 9Z when incoming phone calls are categorized into multiple first groups. The first group includes, for example, a group indicating a type of an incoming phone call. The first group includes, for example, a group indicating a category of an incoming phone call into which a user wishes to categorize. Examples of the first group include, but are not limited to, caller registered in the address list data 9C, anonymous call, payphone, caller not registered in the address list data 9C, etc. The configuration data 9Z indicates that the group of caller registered in the address list data 9C is assigned to the software key $30b_1$. The configuration data 9Z indicates that the group of anonymous call is assigned to the software key $30b_2$. The configuration data 9Z indicates that the group of payphone is assigned to the software key $30b_3$. The configuration data 9Z indicates that the group of caller not registered in the address list data 9C is assigned to the software key $30b_4$.

In the example illustrated in FIG. 5, the electronic device 1 uses four groups of the first group, but not limited thereto. For example, the electronic device 1 can use only one group of the first group. In this case, the configuration data 9Z associates the one first group with one or more software keys. For example, when the first group is the group of caller registered in the address list data 9C, the electronic device 1 determines whether the caller of the incoming phone call is a caller that is registered in the address list data 9C.

Figure 6:
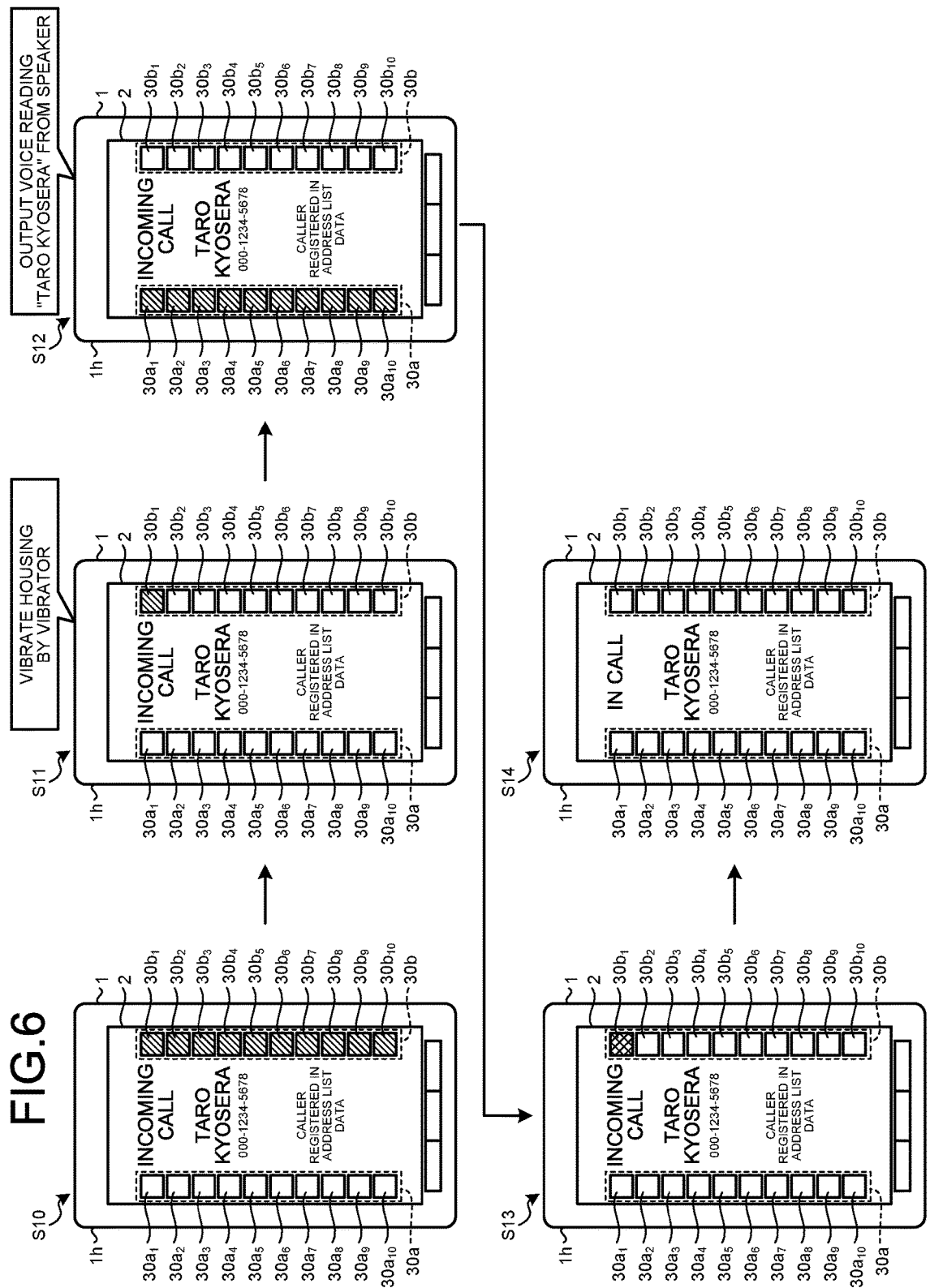
FIG. 6 is a diagram for explaining one example of notification of an incoming phone call of the electronic device according to the embodiment.

FIG. 6 is a diagram for explaining one example of notification of an incoming phone call of the electronic device 1 according to the embodiment. In the example illustrated in FIG. 6, it is configured such that the four software keys are associated with the four groups of the first group, respectively as illustrated in FIG. 5, in the configuration data 9Z.

At Step S10 in FIG. 6, the electronic device 1 detects an incoming phone call from a phone number that is registered in the address list data 9C by the communication unit 6. The electronic device 1 identifies the first group to which the incoming phone call belongs, based on the phone number of a source of the incoming phone call and the address list data 9C. When the phone number of the source is registered in the address list data 9C, the electronic device 1 identifies a group of caller registered in the address list data 9C as the first group. In this case, the electronic device 1 can identify the caller of the incoming phone call from the address list data 9C based on the phone number of the incoming phone call and the address list data 9C. The electronic device 1 assigns the identified first group to the software key $30b_1$ based on the configuration data 9Z. Assigning the first group to a software key includes, for example, switching between valid/invalid of an operation of a user with respect to a software key to which the first group has been assigned in advance. Assigning the first group to a software key includes, for example, determining a software key to be used for receiving a phone call. Assigning the first group to a software key may include, for example, displaying multiple software keys in a display region on the touch screen display 2 by the electronic device 1. The electronic device 1 displays a screen notifying that a phone call is being received on the touch screen display 2, and outputs a ringtone from the speaker 11. The electronic device 1 displays multiple software keys on the touch screen display 2 in a manner aligned in rows along one edge and the other edge of the touch screen display 2. In the example illustrated in FIG. 6, a right side of the touch screen display 2 is one, and a left side thereof is the other.

At Step S10, the user has noticed an arrival of a phone call by the ringtone of the electronic device 1. The user slides a finger on a part or all of the software keys including the software key $30b_1$ to which the first group is assigned, along one edge of the touch screen display 2. For example, the user is performing tentative selection operation of software keys sequentially from the software key $30b_1$. Examples of the tentative selection operation include, but are not limited to, a touch, a tap, a flick, etc. with respect to a software key.

At Step S11, the electronic device 1 continues outputting the ringtone. The electronic device 1 detects a tentative selection operation with respect to the software key $30b_1$ to which the first group is assigned, through the touch screen 2B. The electronic device 1 notifies that it is the first group assigned to the software key $30b_1$. In the example illustrated in FIG. 6, the electronic device 1 vibrates the housing 1h at a predetermined vibration pattern by the vibrator 16. Examples of the predetermined vibration pattern include, but are not limited to, vibration patterns of continuous vibration for predetermined time, a combination of vibrating and not vibrating in succession, etc. Thus, the electronic device 1 can notify of an arrival of a phone call and the first group by the ringtone and vibration of the housing 1h.

At Step S11, the user can guess, based on arrangement of the software key that is tentatively selected at the time when the housing 1h vibrates, the first group corresponding to the software key. For example, recognizing that the electronic device 1 is notifying that it is the first group by the software key $30b_1$, the user can determine that the call is from the first group that is assigned to the software key $30b_1$.

For example, if the user knows that the first group of caller registered in the address list data 9C is assigned to the software key $30b_1$, the user can confirm whether a caller is a person that is registered in the address list data 9C based on the notification of the software key $30b_1$. Therefore, the electronic device 1 can let a user confirm who is a caller based on a software key without having the user confirm the display 2A. The electronic device 1 can let a user confirm who is a caller of an incoming phone call using a software key, even when the user is a person with visual impairment. The electronic device 1 can notify of an arrival of a phone call using a software key instead of using sound to notify that it is the first group, and thus the electronic device 1 can let a user confirm who is a caller of an incoming phone call without letting other people therearound notice.

Moreover, at Step S11, the user slides a finger on a part or all of the software keys 30$a_1$, . . . , 30$a_{10}$ along the other edge (left side in FIG. 6) of the touch screen display 2 to confirm the first group.

At Step S12, the electronic device 1 continues outputting the ringtone. The electronic device 1 detects an operation with respect to a part or all of the software keys 30$a_1$, . . . , 30$a_{10}$ through the touch screen 2B. In this case, the electronic device 1 determines that the software key 30$b_1$ is selected by the user, and outputs reading sound of information relating to the first group from the speaker 11. In the example in FIG. 6, as the phone number of the incoming phone call is registered in the address information of the identification number "ID1" of the address list data 9C, the electronic device 1 performs reading processing of "Taro Kyosera" that is specified in the item of name of the address information. The reading processing includes, for example, processing of converting data to be read into sound, and of outputting the converted sound from the speaker 11. The electronic device 1 outputs the sound of "Taro Kyosera" from the speaker 11.

At Step S12, the user can confirm who is a caller of the incoming phone call by the sound output from the speaker 11 of the electronic device 1.

At Step S13, the user determines to answer the phone, and makes selection operation of the software key 30$b_1$ to which the first group is assigned. Examples of the selection operation include, but are not limited to, a long touch, a tap, etc. of a software key. The selection operation can include, for example, an operation to press the button 3.

At Step S13, the electronic device 1 continues outputting the ringtone. When detecting the selection operation with respect to the software key 30$b_1$, the electronic device 1 determines that the selection operation is an off-hook operation. The electronic device 1 can detect the off-hook operation of the user by the software key 30$b_1$ to which the first group is assigned. The electronic device 1 accepts the off-hook operation with the software key 30$b_1$ to which the first group is assigned, thereby performing the off-hook operation without having the user confirm the display 2A. As a result, the electronic device 1 can improve the convenience of users in receiving phone calls.

At Step S14, the electronic device 1 ends notification of the arrival of the phone call by outputting the ringtone, and starts a call with an electronic device on the other end through the communication unit 6. The electronic device 1 displays a screen indicating that it is during a call on the touch screen display 2. The user makes a conversation with the caller of the phone call using the electronic device 1.

In the example illustrated in FIG. 6, the case in which the electronic device 1 notifies that it is the first group that is assigned to a software key by vibration of the housing 1$h$ has been explained, but it is not limited thereto. For example, the electronic device 1 can output a notification sound different from the ringtone being output, during when an operation with respect to a software key to which the first group is assigned is detected. For example, the electronic device 1 can change the pattern of the ringtone that is being output, during when an operation with respect to the software key to which the first group is assigned is detected.

In the present embodiment, the case in which the electronic device 1 has software keys arranged on a screen notifying that it is during a call, but it is not limited thereto. For example, the electronic device 1 is not required to have software keys arranged on the screen notifying that it is during a call.

For example, when detecting an arrival of an anonymous phone call by the communication unit 6, the electronic device 1 assigns the first group of the anonymous call to the software key 30$b_2$ based on the configuration data 9Z, and notifies that it is the first group of anonymous call by vibration of the housing 1$h$. For example, if a user knows that the first group indicating an anonymous call is assigned to software key 30$b_2$, the user can confirm that the incoming phone call is an anonymous call when the housing 1$h$ vibrates in response to an operation with respect to the software key 30$b_2$. As a result, the electronic device 1 can prevent a user from accidentally answering an anonymous call.

For example, when detecting an incoming phone call from a payphone by the communication unit 6, the electronic device 1 assigns the first group of payphone to the software key 30$b_3$ based on the configuration data 9Z, and notifies that it is the first group of payphone by vibration of the housing 1$h$. For example, if a user knows that the first group indicating payphone is assigned to software key 30$b_3$, the user can confirm that the incoming phone call is from a payphone when the housing 1$h$ vibrates in response to an operation with respect to the software key 30$b_3$. As a result, the electronic device 1 can prevent a user from accidentally answering a call from a payphone.

For example, when detecting an incoming phone call from a person that is not registered in the address list data 9C by the communication unit 6, the electronic device 1 assigns the first group of caller not registered in the address list data 9C to the software key 30$b_4$ based on the configuration data 9Z. The electronic device 1 notifies an arrival of a call using the software key 30$b_4$. For example, a user knows that the first group indicating caller not registered in the address list data 9C is assigned to software key 30$b_4$. In this case, the user can confirm that the incoming phone call is from a caller not registered in the address list data 9C when the housing 1$h$ vibrates in response to an operation with respect to the software key 30$b_4$. As a result, the electronic device 1 can prevent a user from accidentally answering a call from a caller not registered in the address list data 9C.

For example, when the manner mode is on, the electronic device 1 can notify of an arrival of a phone call and that it is the first group by vibrating the vibrator 16. In this case, the electronic device 1 can vibrate the vibrator 16 in a first vibration pattern, and can change the first vibration pattern to another vibration pattern when notifying the first group. For example, the electronic device 1 can vibrate the vibrator 16 in the first vibration pattern, and can stop the vibrator 16 temporarily when a software key to which the first group is assigned is operated.

Figure 7:
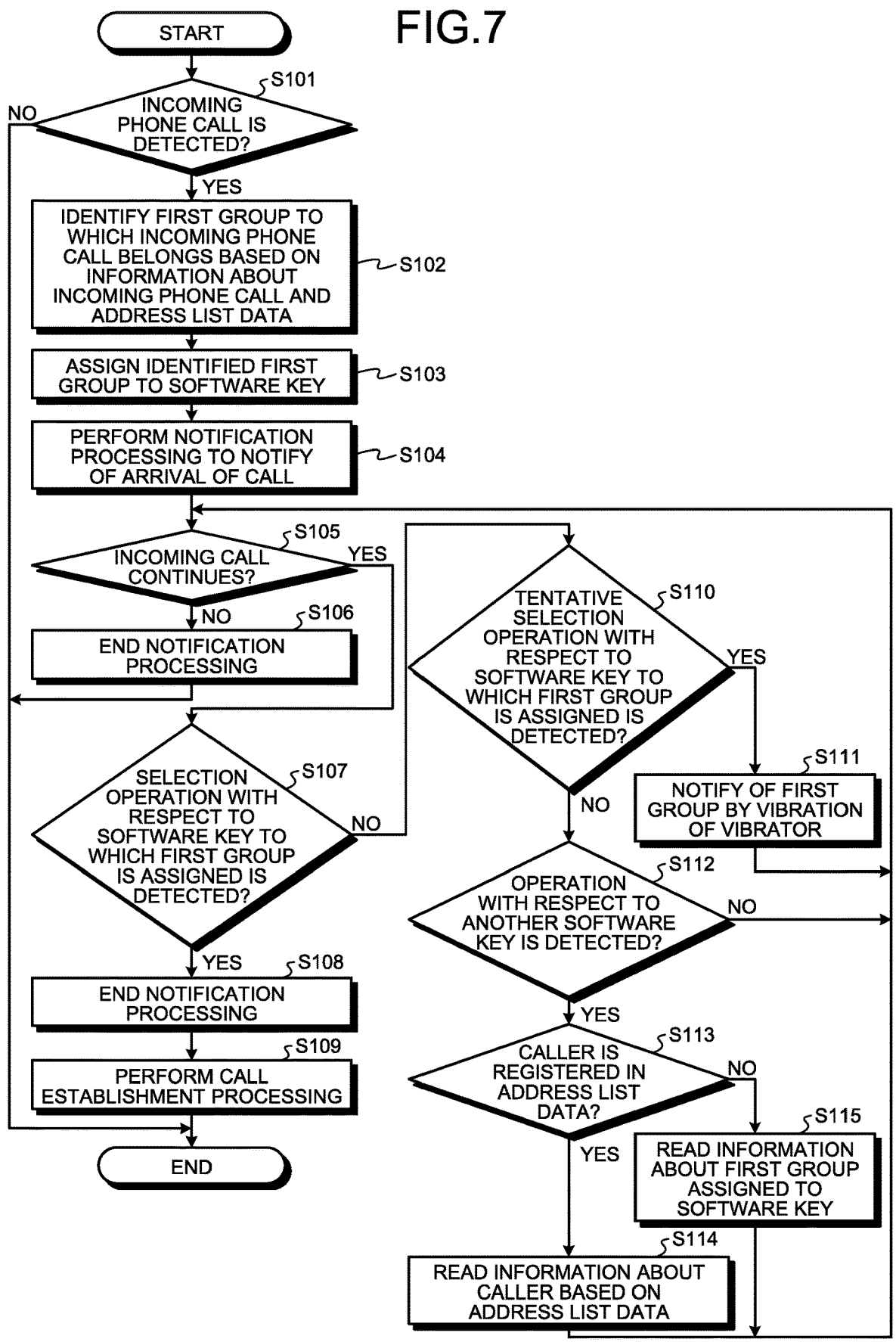
FIG. 7 is a flowchart of one example of a processing procedure of a control relating to the notification of an incoming phone call by the electronic device.

FIG. 7 is a flowchart of one example of a processing procedure of a control relating to the notification of an incoming phone call by the electronic device 1. The processing procedure in FIG. 7 is performed by executing the control code 9A by the controller 10. The processing procedure in FIG. 7 is repeatedly performed by the controller 10.

As indicated in FIG. 7, the controller 10 of the electronic device 1 determines whether an incoming phone call is detected through the communication unit 6 (Step S101). If it is determined that an incoming phone call is not detected (No at Step S101), the controller 10 ends the processing procedure in FIG. 7. If it is determined that an incoming phone call is detected (Yes at Step S101), the controller 10 proceeds the processing to Step S102.

The controller 10 identifies the first group to which the incoming phone call belongs based on information relating to the incoming phone call and the address list data 9C (Step S102). For example, the controller 10 acquires information about a source of the incoming phone call, the phone number, whether it is an anonymous call, whether it is a payphone call, and the like as the information relating to the incoming phone call from a base station, or the like through the communication unit 6. When the acquired information includes the phone number, the controller 10 determines whether the phone number is registered in the address list data 9C. When the phone number is registered in the address list data 9C, the controller 10 identifies the first group as caller registered in the address list data 9C. When the phone number is not registered in the address list data 9C, the controller 10 identifies the first group as caller not registered in the address list data 9C. When the incoming phone call is an anonymous call, the controller 10 identifies the first group as anonymous call. When the incoming phone call is a payphone call, the controller 10 identifies the first group as payphone.

The controller 10 assigns the identified first group to a software key (Step S103). For example, the controller 10 compares the identified first group and the configuration data 9Z to determine a software key, and assigns the first group to the software key.

The controller 10 performs notification processing to notify an arrival of a phone call (Step S104). For example, the controller 10 performs the notification processing to cause the speaker 11 to output a ringtone. The controller 10 proceeds the processing to Step S105 while continuing to perform the notification processing.

The controller 10 determines whether the incoming phone call continues through the communication unit 6 (Step S105). If it is determined that the incoming phone call does not continue (No at Step S105), the controller 10 proceeds the processing to Step S106. The controller 10 terminates the notification processing (Step S106). For example, the controller 10 terminates the notification processing to stop the output of the ring tone. Having terminated the notification processing, the controller 10 ends the processing procedure in FIG. 7.

If it is determined that the incoming phone call continues (Yes at Step S105), the controller 10 proceeds the processing to Step S107. The controller 10 determines whether a selection operation with respect to the software key to which the first group is assigned is detected based on a detection result of the touch screen 2B or the like (Step S107). If it is determined that a selection operation with respect to the software key to which the first group is assigned is detected (Yes at Step S107), the controller 10 proceeds the processing to step S108.

The controller 10 terminates the notification processing similarly to Step S106 (Step S108). Having terminated the notification processing, the controller 10 performs call establishment processing (Step S109). The call establishment processing includes, for example, processing of displaying a screen indicating that it is during a call on the display 2A, processing of outputting a sound signal transmitted from the other end from the receiver 7, or the like, processing of converting a voice of the user into a sound signal and transmitting it to the other end, processing of detecting termination of the call, and the like. Having performed the call establishment processing, the controller 10 ends the processing procedure in FIG. 7.

If it is determined that a selection operation with respect to the software to which the first group is assigned is not detected (No at Step S107), the controller 10 proceeds the processing to Step S110. The controller 10 determines whether a tentative selection operation with respect to the software key to which the first group is assigned is detected based on a detection result of the touch screen 2B or the like (Step S110).

If it is determined that a tentative selection operation with respect to the software key to which the first group is assigned is detected (Yes at Step S110), the controller 10 proceeds the processing to Step S111. The controller 10 notifies that it is the first group by vibration of the housing 1h (Step S111). For example, the controller 10 controls the vibrator 16, thereby vibrating the housing 1h temporarily or in a predetermined vibration pattern. Having finished notifying that it is the first group, the controller 10 returns the processing to Step S105 explained above.

If it is determined that a tentative selection operation with respect to the software key to which the first group is assigned is not detected (No at Step S110), the controller 10 proceeds the processing to Step S112. The controller 10 determines whether an operation with respect to another software key is detected based on a detection result of the touch screen 2B or the like (Step S112). Another software key includes, for example, a software key to which the first group is not assigned, a predetermined software key, and the like. If it is determined that an operation with respect to another software key is not detected (No at Step S112), the controller 10 returns the processing to Step S105 explained above. If it is determined that an operation with respect to another software key is detected (Yes at Step S112), the controller proceeds the processing to Step S113.

The controller 10 determines whether the caller is registered in the address list data 9C (Step S113). If it is determined that the caller is registered in the address list data 9C (Yes at Step S113), the controller proceeds the processing to Step S114. The controller 10 reads information about the caller based on the address list data 9C (Step S114). For example, the controller 10 identifies the address information based on the phone number of the caller, and outputs information specified in the item of name in the address information in sound from the speaker 11. Having finished reading the information of the caller, the controller 10 returns the processing to Step S105 explained above.

If it is determined that the caller is not registered in the address list data 9C (No at Step S113), the controller 10 proceeds the processing to Step S115. The controller 10 reads the information of the first group that is assigned to the software key (Step S115). For example, the controller 10 outputs the information of the first group that is assigned to the software key in sound from the speaker 11. Having finished reading the information of the first group, the controller 10 returns the processing to Step S105 explained above.

In the example in FIG. 7, the case has been explained in which information is read by the electronic device 1 if an operation with respect to a software key different from a software key to which the first group is assigned is detected, but it is not limited thereto. For example, the electronic device 1 can have a user set ON/OFF of a reading function, and can read information only when the reading function is on.

Figure 8:
FIG. 8 illustrates another example of the configuration data.

FIG. 8 illustrates another example of the configuration data 9Z. The configuration data 9Z includes information indicating correspondence between the first group and software keys to which the first group is assigned, similarly to the example in FIG. 5. When groups are registered in the address list data 9C, the configuration data 9Z includes information indicating correspondence between the first group and the second group. The configuration data 9Z includes information indicating correspondence between the second group and software keys to which the second group is assigned. A user can identify the second group based on a software key by remembering the correspondence between the second group and software keys in the configuration data 9Z.

In the example illustrated in FIG. 8, the configuration data 9Z indicates that the second group of caller registered in the address list data 9C is associated with the second group, and the other first groups are not associated with the second group. The second group includes groups such as family, friend, work, and shop set in the address list data 9C. The configuration data 9Z indicates that the group "family" is assigned to the software key $30a_1$. The configuration data 9Z indicates that the group "friend" is assigned to the software key $30a_2$. The configuration data 9Z indicates that the group "work" is assigned to the software key $30a_3$. The configuration data 9Z indicates that the group "shop" is assigned to the software key $30a_4$.

In the example illustrated in FIG. 8, the case has been explained in which the second groups and software keys are associated with each other in the configuration data 9Z, but it is not limited thereto. The configuration data 9Z can set information indicating designations of a group in the address list data 9C or name as the information to be assigned to a software key. For example, the configuration data 9Z can include information indicating that the second group is assigned to multiple software keys. For example, when the second group is "family", "Ka", "Zo", "Ku", which are Japanese syllabary characters constituting "family", can be assigned respectively to the software key $30a_1$, the software key $30a_2$, and the software key $30a_3$ in the configuration data 9Z. When the second group is assigned to multiple software keys, the electronic device 1 can read a character per operated software key. As a result, a user can confirm the second group at a desired reading speed by adjusting the speed of operating the software keys.

The control code 9A can provide a function of notifying of information relating to an incoming phone call using a software key different from a software key to which the first group is assigned, in addition to the above function. For example, the control code 9A can provide a function of notifying of information of group relating to the incoming phone call using the software keys $30a_1, \ldots, 30a_4$ indicated in the configuration data 9Z.

Figure 9:
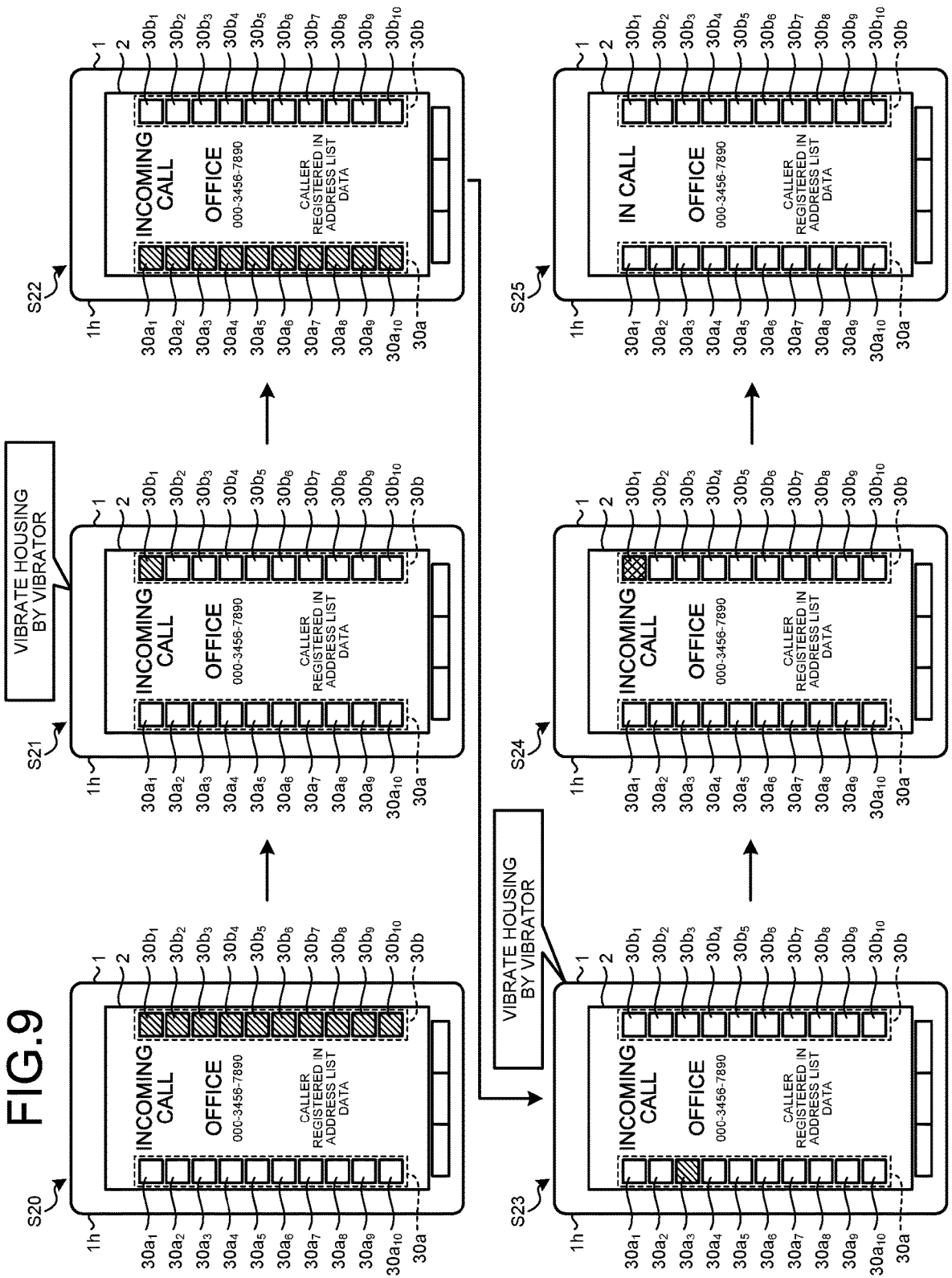
FIG. 9 is a diagram for explaining another example of the notification of an incoming phone call of the electronic device according to the embodiment.

FIG. 9 is a diagram for explaining another example of the notification of an incoming phone call of the electronic device 1 according to the embodiment. In the example illustrated in FIG. 9, the four software keys are associated with four groups in the first group, respectively in the configuration data 9Z, as illustrated in FIG. 8. As illustrated in FIG. 8, the four software keys are associated with the four groups, respectively in the configuration data 9Z. Information of the address list data 9C includes, for example, one or more groups of the second group. In the example illustrated in FIG. 9, the information of the address list data 9C includes four groups illustrated in FIG. 4 as the second group. When a software key to which the first group is assigned is selected, the control code 9A can provide a function of assigning one or more groups of the second group to software keys that have not been selected. For example, a selection operation with respect to a software key can include a tentative selection operation. When a software key to which the first group is assigned is selected, the controller 10 assigns one or more groups in the second group to software keys that have not been selected, by executing the control code 9A.

At Step S20 in FIG. 9, the electronic device 1 detects an arrival of a phone call from a phone number that is registered in the address list data 9C by the communication unit 6. The electronic device 1 identifies the first group to which the incoming phone call belongs, based on the phone number of a source of the incoming phone call and the information in the address list data 9C. When the phone number of the source is registered in the address list data 9C, the electronic device 1 identifies the group of caller registered in the address list data 9C as the first group. In this case, the electronic device 1 can identify the caller based on the phone number of the incoming phone call and the address list data 9C. The electronic device 1 displays the screen notifying that a phone call is being received on the touch screen display 2, and outputs a ringtone from the speaker 11. The screen notifying that a phone call is being received can include, for example, information indicating the first group. The electronic device 1 assigns the identified first group to the software key $30b_1$ based on the configuration data 9Z. The electronic device 1 displays software keys on the touch screen display 2 in a manner aligned in rows along one edge and the other edge of the touch screen display 2. In the example illustrated in FIG. 9, the right side of the touch screen display 2 is one, and the left side thereof is the other.

At Step S20, a user has noticed the arrival of a phone call by the ringtone of the electronic device 1. The user slides a finger on a part or all of the software keys including the software key $30b_1$ to which the first group is assigned, along one edge of the touch screen display 2. That is, the user is performing the tentative selection operation of software keys sequentially from the software key $30b_1$.

At Step S21, the electronic device 1 continues outputting the ringtone. The electronic device 1 detects a tentative selection operation with respect to the software key $30b_1$ to which the first group is assigned, through the touch screen 2B. The electronic device 1 notifies of the first group assigned to the software key $30b_1$. In the example illustrated in FIG. 9, the electronic device 1 vibrates the housing $1h$ in a predetermined vibration pattern by the vibrator 16. Examples of the predetermined vibration pattern include, but are not limited to, vibration patterns of continuous vibration for predetermined time, a combination of vibrating and not vibration in succession, etc. Thus, the electronic device 1 can notify of an arrival of a phone call and the first group by the ringtone and vibration of the housing $1h$.

At Step S21, the user can guess, based on arrangement of the software key that is tentatively selected at the time when the housing $1h$ vibrates, the first group corresponding to the software key. The user slides a finger on a part or all of the software keys $30a_1, \ldots 30a_{10}$ along the other edge of the touch screen display 2 to confirm the first group.

At Step S21, the electronic device 1 detects a tentative selection operation with respect to the software key $30b_1$ through the touch screen 2B. The electronic device 1 determines whether the first group that is assigned to the software key $30b_1$ subjected to the tentative selection operation is associated with the second group based on the configuration data 9Z. For example, with the first group of caller registered in the address list data 9C, multiple groups in the second group are associated. The electronic device 1 identifies the second group corresponding to the incoming phone call out of the multiple groups of the second group associated with the first group. Having identified the second group, the electronic device 1 assigns the identified second group to a software key that is not subjected to the tentative selection operation.

In the example illustrated in FIG. 9, when the phone number of the incoming phone call is "000-3456-7890", the electronic device 1 identifies the group "work" in the address list data 9C as the second group, and the software key $30a_3$ to which the second group is assigned. The electronic device 1 assigns the identified second group to the software key $30a_3$.

At Step S22, the electronic device 1 continues outputting the ringtone. The electronic device 1 has stopped notifying of the first group.

At Step S22, the user slide a finger on a part or all of the software keys $30a_1, \ldots 30a_{10}$ along the other edge of the touch screen display 2 to confirm the second group. That is, the user is performing the tentative selection operation with respect to the software keys including the software key $30a_3$ to which the second group is assigned.

At Step S23, the electronic device 1 continues outputting the ringtone. The electronic device 1 detects the tentative selection operation with respect to the software key $30a_3$ to which the second group is assigned through the touch screen 2B. The electronic device 1 notifies that it is the second group to which the software key $30a_3$ is assigned. In the example illustrated in FIG. 9, the electronic device 1 vibrates the housing 1h in a predetermined vibration pattern by the vibrator 16. Thus, the electronic device 1 can notify of an arrival of the incoming phone call and the second group by the ringtone and the vibration of the housing 1h.

At Step S23, when notified of the second group by the electronic device 1, the user can determine that the second group is assigned to the software key $30a_3$. For example, if the user knows that the group "work" in the second group is assigned to software key $30a_3$, the user can confirm that the caller of the incoming phone call is a business associate. Accordingly, the electronic device 1 enables a user to guess a caller based on a software key without confirming the display 2A. The electronic device 1 enables a user to guess a caller based on a software key even when the user is, for example, a person with visual impairment. For example, even in a situation in which personal phone calls from a friend are not allowed to be answered, if it is possible to recognize that a caller is a business associate, a user can selectively answer the call only. Furthermore, when a software key to which the second group is assigned is determined in advance, a user is enabled to guess the second group, and the processing of reading information of the second group in sound can be omitted.

At Step S24, the electronic device 1 continues outputting the ringtone. When detecting the selection operation with respect to the software key $30b_1$, the electronic device 1 determines that the selection operation is an off-hook operation. The electronic device 1 can detect the off-hook operation of the user by the software key $30b_1$ to which the first group is assigned. The electronic device 1 accepts the off-hook operation with the software key $30b_1$ to which the first group is assigned, thereby performing the off-hook operation without having the user confirm the display 2A. As a result, the electronic device 1 can improve the convenience of users in receiving phone calls.

At Step S25, the electronic device 1 ends the notification of the arrival of the phone call by outputting the ringtone, and starts a call with an electronic device on the other end through the communication unit 6. The electronic device 1 displays a screen indicating that it is during a call on the touch screen display 2. The user makes a conversation with the caller of the incoming phone call using the electronic device 1.

In the example illustrated in FIG. 9, the case in which the electronic device 1 notifies that it is the second group that is assigned to a software key by vibration of the housing 1h has been explained, but it is not limited thereto. For example, the electronic device 1 can output a notification sound different from the ringtone being output, during when an operation with respect to a software key to which the second group is assigned is detected. For example, the electronic device 1 can change the pattern of the ringtone that is being output, during when an operation with respect to the software key to which the second group is assigned is detected. For example, the electronic device 1 can notify of the first group and the second group by varying the vibration patterns of the housing 1h.

Figure 10:
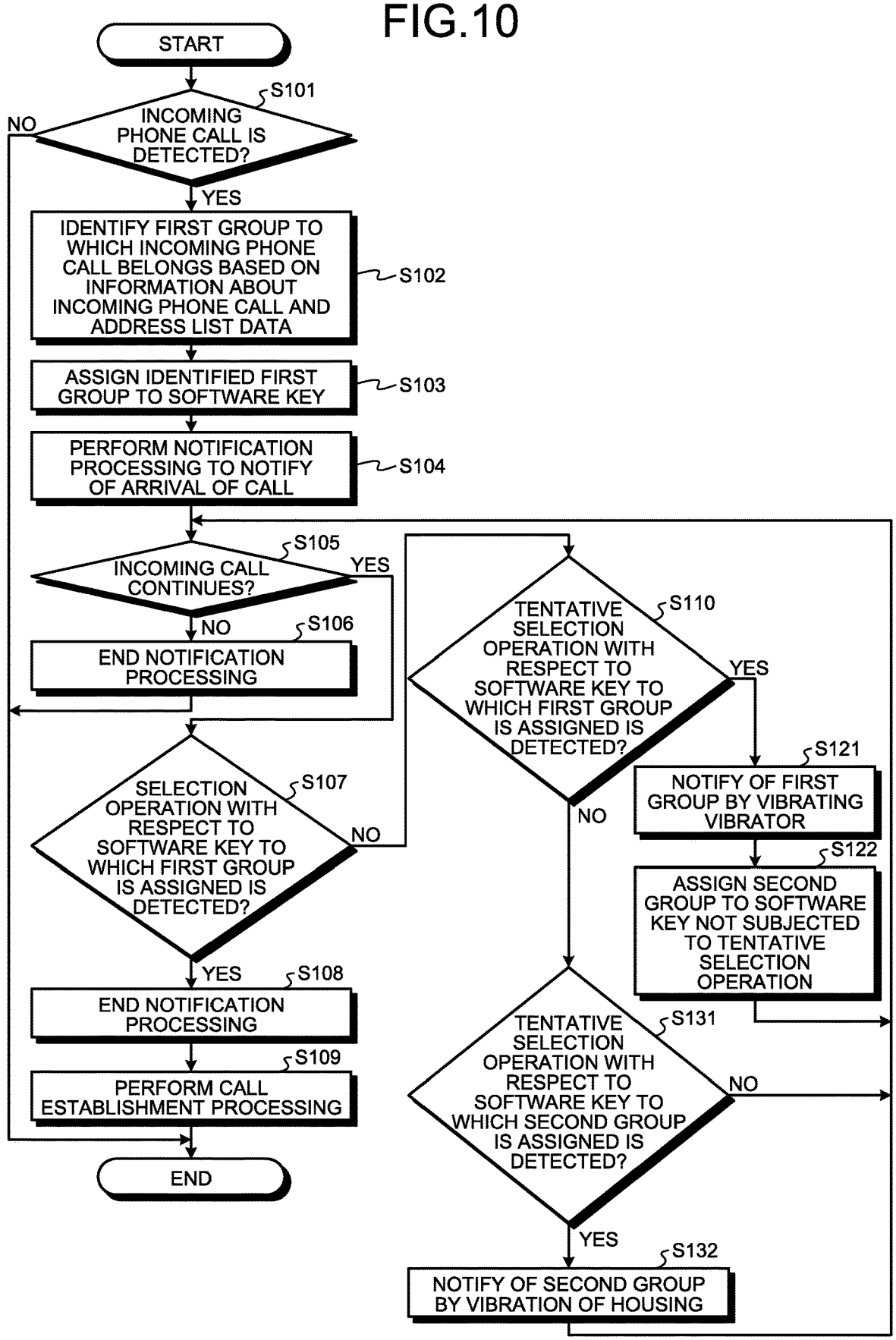
FIG. 10 is a flowchart of another example of a processing procedure of the control relating to the notification of an incoming phone call by the electronic device.

FIG. 10 is a flowchart of another example of the processing procedure of the control relating to the notification of an incoming phone call by the electronic device 1. The processing procedure indicated in FIG. 10 is performed by executing the control code 9A by the controller 10. The processing procedure indicated in FIG. 10 is repeatedly performed by the controller 10.

In the example indicated in FIG. 10, the processing from Step S101 to Step S109 are the same as the processing from Step S101 to Step S109 in FIG. 8, and therefore, only points that differ therefrom are explained, and explanation of the same points is omitted.

As indicated in FIG. 10, the controller 10 of the electronic device 1 performs the processing from Step S101 to Step S105. The controller 10 determines whether a selection operation with respect to a software key to which the first group is assigned is detected based on a detection result of the touch screen 2B or the like (Step S107). If it is determined that a selection operation with respect to the software key to which the first group is assigned is not detected (No at Step S107), the controller 10 proceeds the processing to Step S110.

The controller 10 determines whether a tentative selection operation with respect to the software key to which the first group is assigned is detected based on a detection result of the touch screen 2B or the like (Step S110).

If it is determined that a tentative selection operation with respect to the software key to which the first group is assigned is detected (Yes at Step S110), the controller 10 proceeds the processing to Step S121. The controller 10 notifies that it is the first group by vibration of the housing 1h (Step S121). For example, the controller 10 controls the vibrator 16, thereby vibrating the housing 1h temporarily or in a predetermined vibration pattern. Having finished notifying of the first group, the controller 10 proceeds the processing to Step S122.

The controller 10 assigns the second group to a software key that is not subjected to the tentative selection operation (Step S122). For example, the controller 10 assigns the second group that is associated with the first group subjected to the tentative selection operation to a software key that is not subjected to a tentative selection operation, based on settings in the configuration data 9Z. For example, when the second group is not associated with the first group subjected to the tentative selection operation, the controller 10 does not perform the processing at Step S122. Having finished the processing at Step S122, or having skipped the processing at Step S122, the controller 10 returns the processing to Step S105 explained above.

If it is determined that a tentative selection operation with respect to the software key to which the first group is assigned is not detected (No at Step S110), the controller 10 proceeds the processing to Step S131. The controller 10 determines whether a tentative selection operation with respect to the software key to which the second group is assigned is detected based on a detection result of the touch screen 2B or the like (Step S131). If it is determined that the tentative selection operation with respect to the software key to which the second group is assigned is not detected (No at Step S131), the controller 10 returns the processing to Step S105 explained above.

If it is determined that a tentative selection operation with respect to the software key to which the second group is assigned is detected (Yes at Step S131), the controller 10 proceeds the processing to Step S132. The controller 10 notifies that it is the second group by vibration of the housing 1h (Step S132). For example, the controller 10 controls the vibrator 16, thereby vibrating the housing 1h temporarily or in a predetermined vibration pattern corresponding to the second group. Having finished notifying of the second group, the controller 10 returns the processing to Step S105 explained above.

Figure 11:
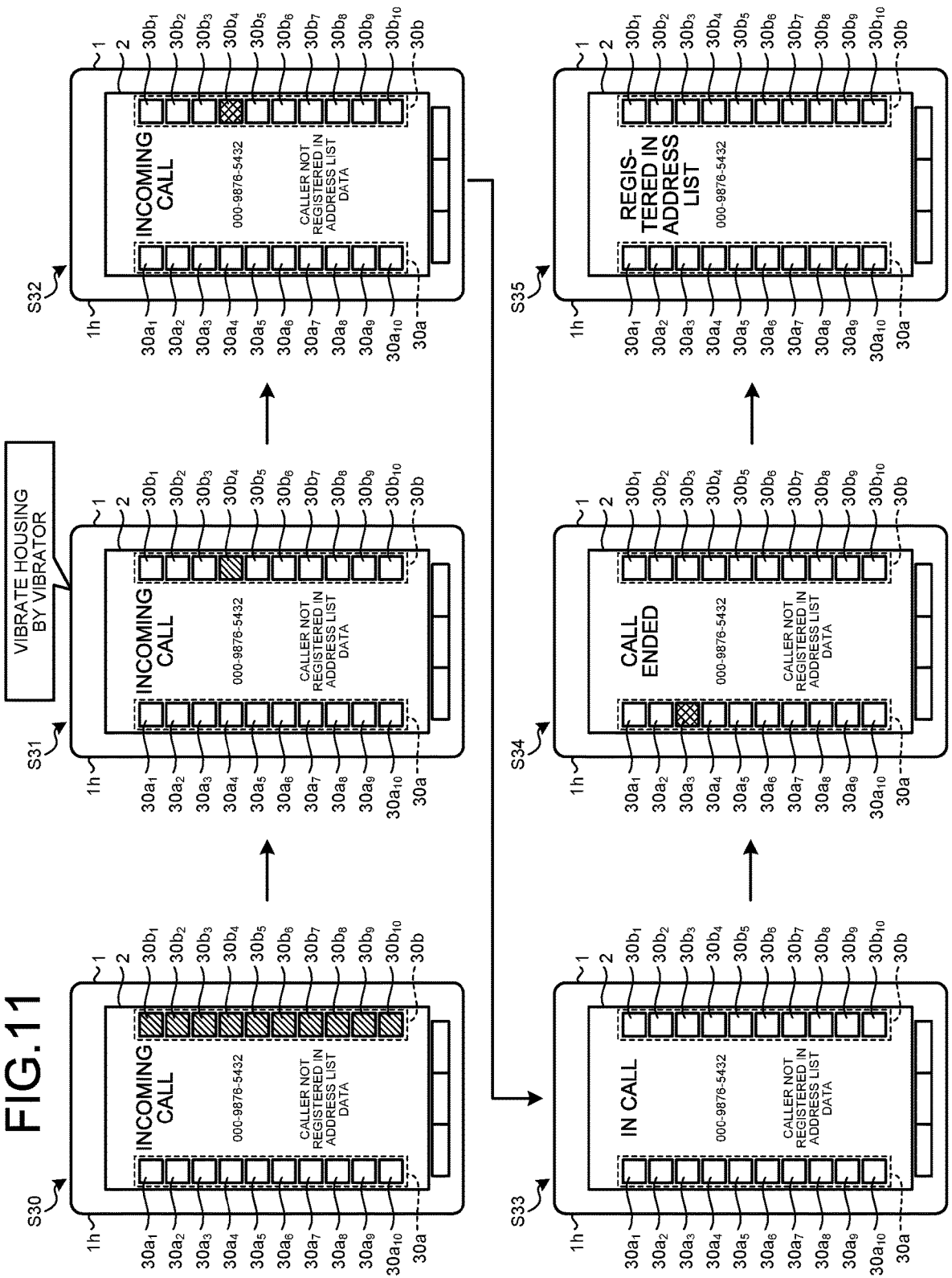
FIG. 11 is a diagram for explaining another example of the notification of an incoming phone call by the electronic device according to the embodiment.

FIG. 11 is a diagram for explaining another example of the notification of an incoming phone call by the electronic device 1 according to the embodiment. In the example illustrated in FIG. 11, the four software keys are associated with four groups in the first group, respectively in the configuration data 9Z, as illustrated in FIG. 5. The control code 9A in the storage 9 can provide a function of assigning the second group to a software key that has not been selected when a software key to which the first group is assigned is selected. For example, the selection of a software key can include tentative selection.

At Step S30 in FIG. 11, the electronic device 1 has detected an arrival of a phone call from a person (phone number) that is not registered in the address list data 9C by the communication unit 6. The electronic device 1 identifies the first group to which the incoming phone call belongs based on the phone number of a source of the incoming phone call and the information in the address list data 9C. When the phone number of the source is not registered in the address list data 9C, the electronic device 1 identifies caller not registered in the address list data 9C as the first group. The electronic device 1 assigns the first group of caller not registered in the address list data 9C to the software key $30b_4$ based on the configuration data 9Z. The electronic device 1 displays a screen notifying that a phone call is being received on the touch screen display 2, and outputs a ringtone from the speaker 11. The electronic device 1 displays multiple software keys on the touch screen display 2 in a manner aligned in rows along one edge and the other edge of the touch screen display 2. In the example illustrated in FIG. 11, a right side of the touch screen display 2 is one, and a left side thereof is the other.

At Step S30, the user has noticed an arrival of a phone call by the ringtone of the electronic device 1. The user slides a finger on a part or all of the software keys including the software key $30b_4$ to which the first group is assigned, along one edge of the touch screen display 2. For example, the user is performing tentative selection operation of software keys sequentially from the software key $30b_1$. Examples of the tentative selection operation include a touch, a tap, a flick, etc. with respect to a software key.

At Step S31, the electronic device 1 continues outputting the ringtone. The electronic device 1 detects a tentative selection operation with respect to the software key $30b_4$ to which the first group is assigned, through the touch screen 2B. The electronic device 1 notifies that it is the first group assigned to the software key $30b_4$. In the example illustrated in FIG. 11, the electronic device 1 vibrates the housing 1h in a predetermined vibration pattern by the vibrator 16. Thus, the electronic device 1 can notify of an arrival of a phone call and the first group by the ringtone and vibration of the housing 1h.

At Step S31, the user can guess, based on arrangement of the software key that is tentatively selected at the time when the housing 1h vibrates, the first group corresponding to the software key. Recognizing that the electronic device 1 is notifying of the first group by the software key $30b_4$, the user can determine that the call is from the first group that is assigned to the software key $30b_4$. If the user knows that the first group of caller not registered in the address list data 9C is assigned to the software key $30b_4$, the user can confirm whether the caller of the incoming phone call is from a caller registered in the address list data 9C based on the software key $30b_4$. Therefore, the electronic device 1 can let a user confirm who is a caller based on a software key without having the user confirm the display 2A. The electronic device 1 can let a user confirm who is a caller of an incoming phone call using a software key, even when the user is, for example, a person with visual impairment. Using a software key instead of performing notification with sound or the like, the electronic device 1 can let a user confirm who is a caller of an incoming phone call without letting other people therearound notice.

At Step S32, after recognizing that the caller of the incoming phone call is not registered in the address list data 9C by the notification of the first group corresponding to the software key $30b_4$, the user performs a selection operation with respect to the software key $30b_4$. The electronic device 1 continues outputting the ringtone. When detecting the selection operation with respect to the software key $30b_4$ to which the first group is assigned, the electronic device 1 determines that the selection operation is an off-hook operation. The electronic device 1 can detect the off-hook operation of the user by the software key $30b_4$ to which the first group is assigned.

At Step S33, the electronic device 1 ends the notification of the first group by output of the ringtone and vibration of the housing 1h, and starts a call with an electronic device on the other end through the communication unit 6. The electronic device 1 displays a screen indicating that it is during a call on the touch screen display 2. The user makes a conversation with the caller of the phone call using the electronic device 1.

At Step S34, the user has finished the conversation with the caller of the phone call. When detecting the termination of the call, the electronic device 1 displays a screen indicating an end of call on touch screen display 2. When the user wishes to register the phone number, the call of which has been finished in the address list data 9C, the user performs a tentative selection operation or a selection operation with respect to a software key to which the second group in which registration is wished to be done is assigned. For example, when it is wished to register the phone number, the call of which has been finished in the group "work", the user performs a tentative selection operation or a selection operation with respect to the software key $30a_3$ of the electronic device 1 to which the group "work" is assigned. When detecting the tentative selection operation or the selection operation with respect to the software key $30a_3$, the electronic device 1 performs processing of registering the phone number, the call of which has been finished in the address list data 9C. For example, the electronic device 1 identifies the second group corresponding to the operated software key $30a_3$, and creates address information including information of the second group and the phone number. The electronic device 1 adds the created address information in the address list data 9C in the storage 9.

For example, the electronic device 1 can determine a period for accepting registration of a phone number from a user to a period until a predetermined time passes from when a call is finished. Examples of the predetermined time include the time until the screen indicating an end of call is turned off, the predetermined time from an end of call determined in advance. etc. For example, the electronic device 1 can execute the character-input control code 9B described above to have a user operate software keys to input characters of a name or the like, and set the characters in the address information.

At Step S35, the electronic device 1 displays a screen indicating that the phone number of the received call has been registered in the address list data 9C on the touch screen display 2. For example, the electronic device 1 can notify that the phone number has registered in the address list data 9C by vibration of the housing 1h or the like. As a phone number for which a call has been established can be registered in the address list data 9C just by operating a software key by a user after the call is finished, the electronic device 1 can improve the operability of users when they are busy, or the like. As a result, when a phone call is received from a registered phone number again, the electronic device 1 can notify that it is the second group, and therefore, a user can determine whether the caller is a person that the user knows based on the notification.

In the example illustrated in FIG. 11, the case in which the electronic device 1 notifies that it is the first group or the second group by vibration of the housing 1h has been explained, but it is not limited thereto. For example, the electronic device 1 can output a notification sound different from the ringtone being output, during when a predetermined operation with respect to a software key to which the first group or the second group is assigned is detected. For example, the electronic device 1 can change the pattern of the ringtone that is being output, during when a predetermined operation with respect to the software key to which the first group or the second group is assigned is detected.

The processing of notifying of an arrival of a phone call illustrated in FIG. 11 can be implemented by performing the processing procedure indicated in FIG. 7 or FIG. 10 by the electronic device 1.

Figure 12:
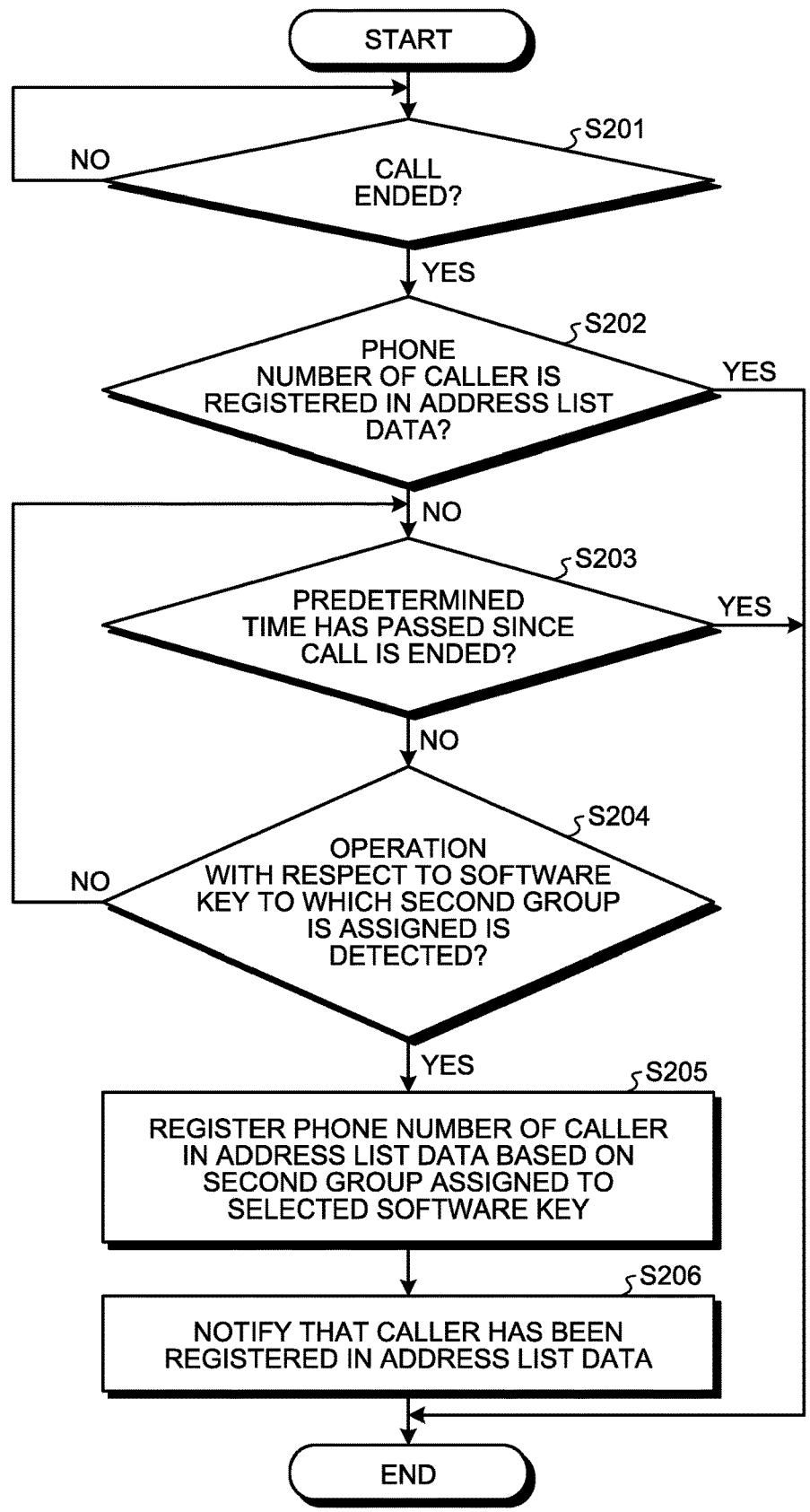
FIG. 12 is a flowchart of one example of a processing procedure of a control to register a caller of an incoming phone call in address list data by the electronic device.

FIG. 12 is a flowchart of one example of a processing procedure of a control to register a caller of an incoming phone call in the address list data 9C by the electronic device 1. The processing procedure indicated in FIG. 12 is implemented by executing the control code 9A by the controller 10. The processing procedure indicated in FIG. 12 is performed by the controller 10 when a phone number of a caller is notified.

As indicated in FIG. 12, the controller 10 of the electronic device 1 determines whether a call has been finished through the communication unit 6 (Step S201). If it is determined that the call has not been finished (No at Step S201), the controller 10 repeats the processing at Step S201. If it is determined that the call has been finished (Yes at Step S201), the controller 10 proceeds the processing to Step S202.

The controller 10 determines whether the phone number of the caller is registered in the address list data 9C (Step S202). If it is determined that the phone number of the caller is registered in the address list data 9C (Yes at Step S202), the controller 10 ends the processing procedure in FIG. 12. If it is determined that the phone number of the caller is not registered in the address list data 9C (No at Step S202), the controller 10 proceeds the processing to Step S203.

The controller 10 determines whether predetermined time has passed since the call is finished (Step S203). For example, the controller 10 determines whether the predetermined time has passed since the call is finished based on a timer, a call end time, a current time, and the like. If it is determined that the predetermined time has passed since the call is finished (Yes at Step S203), the controller 10 ends the processing procedure in FIG. 12. If it is determined that the predetermined time has not been passed since the call is finished (No at Step S203), the controller 10 proceeds the processing to Step S204.

The controller 10 determines whether an operation with respect to a software key to which the second group is assigned is detected based on a detection result of the touch screen 2B (Step S204). For example, as illustrated in FIG. 8, when the second group is assigned to the software keys $30a_1$, $30a_2$, $30a_3$, $30a_4$, the controller 10 determines whether a selection operation or a tentative selection operation with respect to either one of the software keys $30a_1$, $30a_2$, $30a_3$, $30a_4$, to which the second group is assigned is detected. If it is determined that an operation with respect to a software key to which the second group is assigned is not detected (No at Step S204), the controller 10 returns the processing to Step S203 explained above. If it is determined that an operation with respect to a software key to which the second group is assigned is detected (Yes at Step S204), the controller 10 proceeds the processing to Step S205.

The controller 10 registers the phone number of the caller in the address list data 9C based on the second group that is assigned to the selected software key (Step S205). For example, the controller 10 creates address information including information indicating the phone number of the caller and the second group, and registers the address information in the address list data 9C.

The controller 10 notifies that the caller has been registered in the address list data 9C (Step S206). For example, the controller 10 can display a screen indicating the registered phone number, the second group, and the like on the touch screen display 2. For example, the controller 10 can output sound data to notify that the caller has been registered in the address list data 9C from the speaker 11. Having finished notifying the registration, the controller 10 ends the processing procedure in FIG. 12.

In the example in FIG. 12, the case in which a phone number of a caller is registered in the address list data 9C according to an operation with respect to a software key by a user in the electronic device 1 has been explained, but it is not limited thereto. For example, the electronic device 1 can confirm a user whether to register a phone number of a caller.

Embodiments disclosed in the present application can be modified within a range not departing from a gist and a scope of the disclosure. Furthermore, the embodiments and modifications disclosed in the present application can be combined as appropriate. For example, the above embodiments can be modified as follows.

For example, the respective codes illustrated in FIG. 1 can be divided into multiple modules, or can be combined with other codes.

Although it has been explained about the electronic device 1 as an example of an electronic device equipped with the touch screen 2B in embodiments, an electronic device according to claims is not limited to the electronic device. The electronic device according to claims can be a portable electronic device other than the electronic device. Examples of the portable electronic device include, but are not limited to, a mobile phone, a tablet, a portable personal computer, a digital camera, a smart watch, a media player, an electronic book reader, a navigator, and a gaming device.

Although the case in which the electronic device 1 vibrates the housing 1*h* as one example of notification of the first group and the second group has been explained in embodiments, it is not limited thereto. For example, the electronic device 1 can notify of the first group and the second group by light or colors. This can be implemented by providing a light emitting unit, a display unit, and the like in the electronic device 1.

Although the case in which the electronic device 1 assigns the second group to the software keys $30a_1, \ldots, 30a_{10}$, and the first group to software keys $30b_1, \ldots, 30b_{10}$ has been explained in embodiments, it is not limited thereto. For example, the electronic device 1 can provide either set of the software keys $30a_1, \ldots, 30a_{10}$ or set of software keys $30b_1, \ldots, 30b_{10}$ on a screen, and assign the first group and the second group to those software keys.

Although the case in which the electronic device 1 displays no information on the software keys $30a_1, \ldots, 30a_{10}$ and the software keys $30b_1, \ldots, 30b_{10}$ has been explained in embodiments, but it is not limited thereto. For example, the electronic device 1 can display information indicating the assigned groups on software keys to which the first group and the second group are assigned.

Although the case in which the electronic device 1 displays the software keys $30a_1, \ldots, 30a_{10}$ and the software keys $30b_1, \ldots, 30b_{10}$ has been explained in embodiments, it is not limited thereto. For example, the electronic device 1 can display only software keys to which the first group and the second group are assigned.

Figure 13:
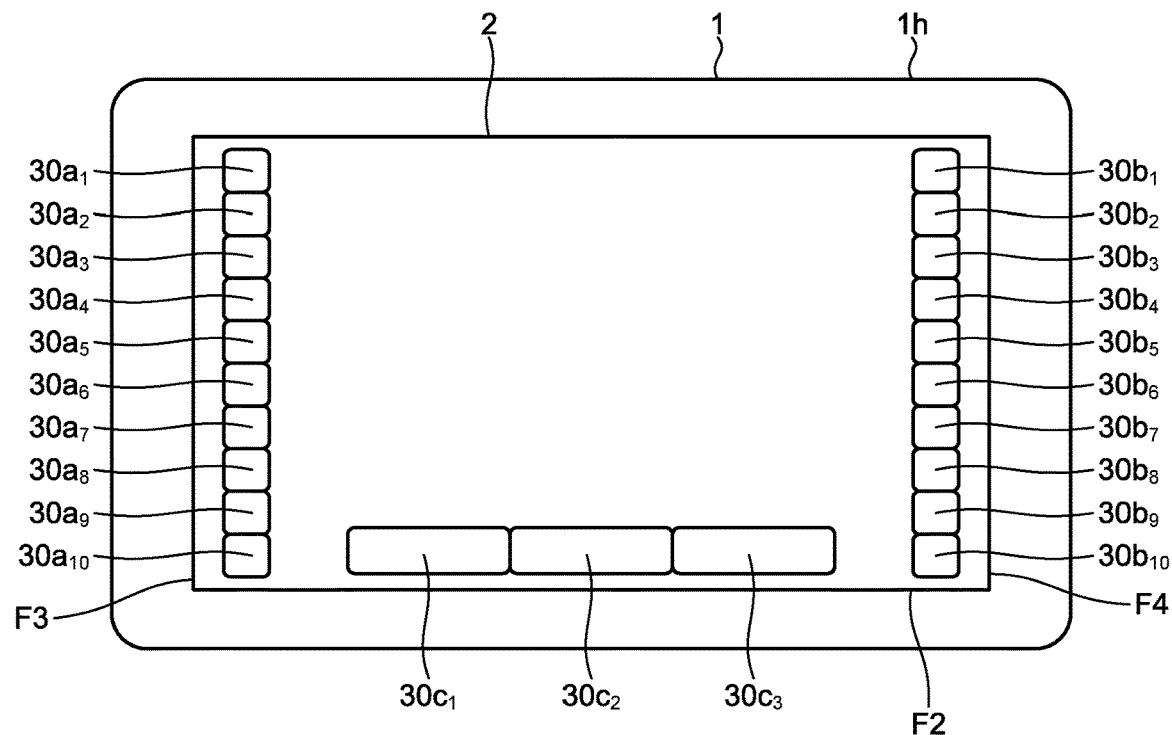
FIG. 13 illustrates another configuration example of the electronic device according to the embodiment.
Figure 14:
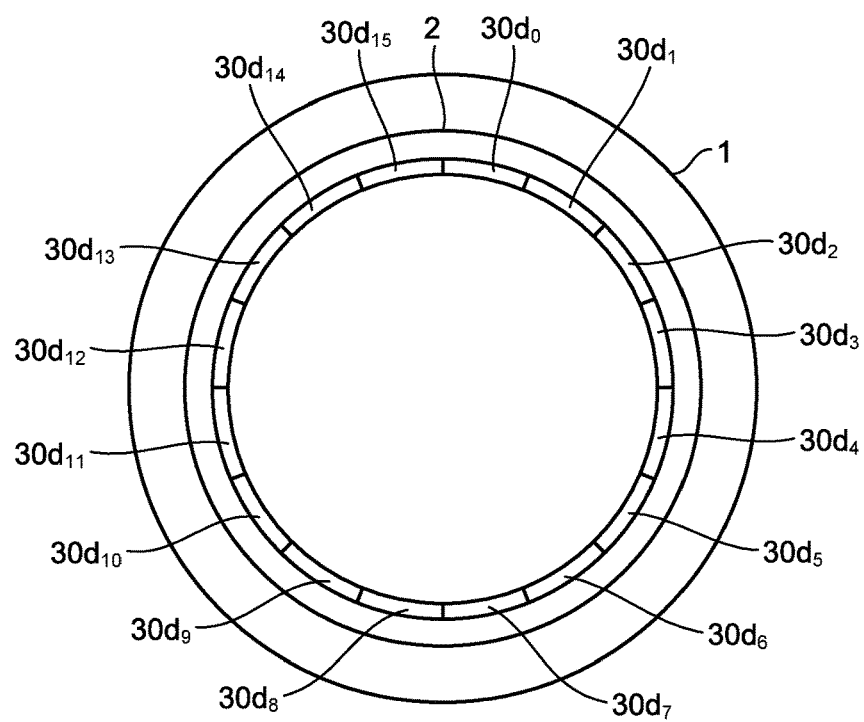
FIG. 14 illustrates another configuration example of the electronic device according to the embodiment.

FIG. 13 and FIG. 14 illustrate another configuration example of the electronic device according to the embodiment. As illustrated in FIG. 13, the electronic device 1 can be used, arranging the housing 1*h* in landscape orientation as illustrated in FIG. 13, unlike the example illustrated in FIG. 2. That is, the software keys $30a_1, \ldots, 30a_{13}$ can be arranged along an edge F3 of the touch screen display 2 of the electronic device 1. Similarly, the software keys $30b_1, \ldots, 30b_{10}$ can be arranged along an edge F4 of the touch screen display 2. In the example illustrated in FIG. 13, the electronic device 1 displays software buttons $30c_1, 30c_2, 30c_3$ on the touch screen display 2, instead of the hardware button 3. In this case, the electronic device 1 can assign the first group or the second group to the software buttons $30c_1, 30c_2, 30c_3$.

As illustrated in FIG. 14, the electronic device 1 can have a substantially circular shape, and have a configuration in which the touch screen display 2 is arranged inside, and multiple software keys are arranged along an edge of the touch screen display 2. In the example illustrated in FIG. 14, the electronic device 1 provides software keys $30d_0, \ldots, 30d_{15}$ along the edge of the touch screen display 2. In this case, the electronic device 1 can assign the first group and the second group to either ones of the software keys $30d_0, \ldots, 30d_{15}$. In the example illustrated in FIG. 14, the electronic device 1 arranges the software keys $30d_0, \ldots, 30d_{15}$ in a ring shape, but it is not limited thereto. For example, the electronic device 1 can arrange one or more software keys in an arc shape along the edge of the touch screen display 2.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device comprising:
   a touch screen;
   a plurality of software keys that are aligned along an edge of the touch screen;
   a storage that stores address list data;
   a communication unit that establishes telephone communication; and
   a controller, wherein
   when detecting an incoming phone call by the communication unit, the controller identifies a sub-group of a first group to which the incoming phone call belongs based on information relating to the incoming phone call and information of the address list data, and assigns the identified first group to one of the plurality of software keys, wherein the first group comprising a first sub-group indicating a caller registered in the address list data, a second subgroup indicating anonymous call, a third sub-group indicating payphone, and a fourth sub-group indicating caller not registered in the address list data, and the controller is configured to assign the identified sub-group to one of the plurality of software keys.

2. The electronic device according to claim 1, wherein the information of the address list data includes one or a plurality of second groups, and
   the controller assigns, when the software key to which the first group is assigned is selected, the second group to one of the plurality of software keys that is not selected.

3. The electronic device according to claim 1, wherein the controller notifies that it is the first group to which the selected software key is assigned, when the software key to which the first group is assigned is selected while the incoming phone call is detected.

4. A control method of an electronic device that includes a touch screen;
   a plurality of software keys that are aligned along an edge of the touch screen;
   a storage that stores address list data; and
   a communication unit that establishes telephone communication, the control method comprising:
   identifying, when an incoming phone call is detected by the communication unit, a subgroup of a first group to which the incoming phone call belongs based on information relating to the incoming phone call and information of the address list data, wherein the first group comprising a first sub-group indicating a caller registered in the address list data, a second subgroup indicating anonymous call, a third sub-group indicating payphone, and a fourth sub-group indicating caller not registered in the address list data; and
   automatically assigning, in response to receiving the incoming phone call, the identified sub-group to which the incoming phone call belongs to one of the plurality of software keys.

5. A non-transitory computer readable recording medium storing therein a code that causes an electronic device that includes
   a touch screen;
   a plurality of software keys that are aligned along an edge of the touch screen;
   a storage that stores address list data; and
   a communication unit that establishes telephone communication to perform:

identifying, when an incoming phone call is detected by the communication unit, a sub-group of a first group to which the incoming phone call belongs based on information relating to the incoming phone call and information of the address list data, wherein the first group comprising a first sub-group indicating a caller registered in the address list data, a second subgroup indicating anonymous call, a third sub-group indicating payphone, and a fourth sub-group indicating caller not registered in the address list data; and assigning the identified sub-group to one of the plurality of software keys.

* * * * *